United States Patent
Vengalil et al.

(10) Patent No.: US 10,129,294 B2
(45) Date of Patent: Nov. 13, 2018

(54) METHOD AND DEVICE FOR CATEGORIZING A STREAM CONTROL TRANSMISSION PROTOCOL (SCTP) RECEIVER TERMINAL AS A MALICIOUS SCTP RECEIVER TERMINAL

(71) Applicant: COUNCIL OF SCIENTIFIC & INDUSTRIAL RESEARCH, New Delhi (IN)

(72) Inventors: Anil Kumar Vengalil, Bangalore (IN); Debabrata Das, Bangalore (IN)

(73) Assignee: Council of Scientific & Industrial Research, New Delhi (IN)

( * ) Notice: Subject to any disclaimer, the term of this patent is extended or adjusted under 35 U.S.C. 154(b) by 171 days.

(21) Appl. No.: 15/101,746

(22) PCT Filed: Mar. 27, 2014

(86) PCT No.: PCT/IN2014/000195
§ 371 (c)(1),
(2) Date: Jun. 3, 2016

(87) PCT Pub. No.: WO2015/118553
PCT Pub. Date: Aug. 13, 2015

(65) Prior Publication Data
US 2017/0026405 A1 Jan. 26, 2017

(30) Foreign Application Priority Data

Feb. 6, 2014 (IN) .............................. 348/DEL/2014

(51) Int. Cl.
*H04L 29/06* (2006.01)

(52) U.S. Cl.
CPC ...... *H04L 63/1458* (2013.01); *H04L 63/1416* (2013.01); *H04L 63/166* (2013.01); *H04L 65/608* (2013.01); *H04L 2463/141* (2013.01)

(58) Field of Classification Search
CPC ............. H04L 63/1458; H04L 63/1416; H04L 63/166; H04L 65/608; H04L 2463/141
See application file for complete search history.

(56) References Cited

U.S. PATENT DOCUMENTS 6,694,471 B1 * 2/2004 Sharp .................... H04L 1/1874
709/224
7,890,637 B1 * 2/2011 Zhang ............... H04L 29/12952
370/401

(Continued)

FOREIGN PATENT DOCUMENTS

EP   2 106 095 A1   9/2009
EP   1 463 265 B1   1/2013

OTHER PUBLICATIONS

A. K. Vengalil, "Feedback Manipulation Flooding Attack: Feasibility Evaluation and Impact Quantification on Stream control Transmission Protocol", The 7th International Conference for Internet Technology and Secured Transactions (ICITST—2012), IEEE, Dec. 10, 2012; pp. 420-425.

(Continued)

*Primary Examiner* — Techane Gergiso
(74) *Attorney, Agent, or Firm* — Baker & Hostetler LLP

(57) ABSTRACT

A method and a device are provided for categorizing a Stream Control Transmission Protocol (SCTP) receiver terminal (120) as a malicious SCTP receiver terminal, which generates spoofed optimistic SCTP selective acknowledgement (SACK) packet for exploiting a SCTP transmitter terminal as a flood source for Denial-of-Service attacks. The SCTP receiver terminal (120) generates data enriched SCTP SACK packets (170). Each data enriched SCTP SACK packet comprises a cumulative payload essence of all successfully received data packets (200). The SCTP transmitter terminal (110) performs a data enriched SACK validation in which it computes the cumulative payload essence of all (Continued)

successfully transmitted data packets (200), and compares the computed value with the cumulative payload essence contained in the received data enriched SACK. The SCTP transmitter terminal detects a spoofed optimistic SACK packet if the comparison results in a difference.

22 Claims, 12 Drawing Sheets

(56) References Cited

U.S. PATENT DOCUMENTS

| | | | |
|---|---|---|---|
| 7,965,625 B2* | 6/2011 | Yasuoka | H04L 1/1829 370/218 |
| 8,195,750 B1 | 6/2012 | Bakhmutov | |
| 2005/0022089 A1* | 1/2005 | Le | H04L 1/0001 714/749 |
| 2005/0091307 A1* | 4/2005 | Venkatsubra | H04L 29/06027 709/203 |
| 2006/0164974 A1* | 7/2006 | Ramalho | H04L 29/06027 370/219 |
| 2006/0259845 A1* | 11/2006 | Baek | H04L 1/1809 714/748 |
| 2007/0280238 A1* | 12/2007 | Lund | H04L 45/04 370/392 |
| 2008/0205445 A1* | 8/2008 | Kumar | H04L 69/16 370/469 |
| 2008/0219162 A1* | 9/2008 | Akyol | H04L 47/10 370/232 |
| 2011/0141904 A1* | 6/2011 | Viger | H04L 47/196 370/241 |
| 2011/0154492 A1 | 6/2011 | Jeong et al. | |
| 2011/0194453 A1* | 8/2011 | Yamasaki | H04L 1/1614 370/252 |
| 2012/0054869 A1 | 3/2012 | Yen et al. | |
| 2012/0320752 A1* | 12/2012 | Gouache | H04L 45/24 370/237 |
| 2013/0304796 A1* | 11/2013 | Jackowski | H04L 47/19 709/202 |
| 2014/0153574 A1* | 6/2014 | Louzoun | H04L 1/188 370/392 |

OTHER PUBLICATIONS

S. Savage, "TCP Congestion Control with a Misbehaving Receiver", Computer Communication Review, vol. 29, No. 5, Oct. 1, 1999, pp. 71-78.

C.-F. Chan Aldar, "Efficient Defence Against Misbehaving TCP Receiver DoS Attacks", Computer Networks, vol. 55, No. 17, Aug. 12, 2011, pp. 3904-3914.

* cited by examiner

METHOD AND DEVICE FOR CATEGORIZING A STREAM CONTROL TRANSMISSION PROTOCOL (SCTP) RECEIVER TERMINAL AS A MALICIOUS SCTP RECEIVER TERMINAL

CROSS REFERENCE TO RELATED APPLICATIONS

This application is a National Stage of International Application No. PCT/IN2014/000195, filed on Mar. 27, 2014, which claims priority to Indian patent application no, 348/DEL/2014, filed on Feb. 6, 2014, the disclosures of which are incorporated by reference in their, entirety.

FIELD OF THE INVENTION

The broad field of the invention is communication or data transfer over packet switched network, and a more specific field of the invention is design of robust communication protocol against potential Denial-of-Service (DoS) and Distributed Denial-of-Service (DDoS) attack exploitation. Particularly, the present invention relates to method and device for categorizing a Stream Control Transmission Protocol (SCTP) receiver terminal as a malicious SCTP receiver terminal. The present invention further relates to detection and elimination of optimistic selective acknowledgement (SACK) spoofing based DoS and DDoS attacks on SCTP transmitter terminal through data enriched SACK.

BACKGROUND OF THE INVENTION

The following background discussion includes information that may be useful in understanding the present invention. It is not an admission that any of the information provided herein is prior art or relevant to the presently claimed invention, or that any publication specifically or implicitly referenced is prior art.

Flooding Denial-of-Service (DoS) attack or a distributed variant of it called Distributed DoS (DDoS) attack is one of the most disastrous security threats that the Internet is facing today. Though such attacks are not new on the Internet, they have been gaining significant momentum and sophistication during the past three decades. Noticeably, some of the most powerful flooding attacks reported in year 2010 and 2011 involved traffic rates of 100 Gbps and 60 Gbps respectively. If the Internet access link of a target network is bombarded with such a huge magnitude of flood, the entire target network can be virtually detached from the Internet through traffic jamming. This will eventually create a complete denial-of-service scenario by blocking the movement of any legitimate traffic between the target network and the Internet. Apart from imposing a complete DoS scenario to the target network, malicious traffic of huge magnitude can also destabilize the operation of a larger part of the connected upstream network including the Internet.

Most of the sophistication in flooding DoS attacks is centered on flood generation strategy. As a prior step towards launching a conventional brute-force flooding DoS attack, the attacker first compromises vulnerable computers on the Internet and install attack program. The compromised computer running a malicious program is called a bot or zombie, and a network of several such bots under the control of the attacker is called botnet. The attacker instructs the botnet to generate and direct the flood traffic to the victim on behalf of the attacker. The flood typically consists of large number of routable Internet Protocol (IP) datagram with each containing a TCP (Transmission Control Protocol) or UDP (User Datagram Protocol) segment at the payload field of the IP datagram. Thus, as far as protocol syntax and semantic are concerned, flood packets are identical to any other TCP/IP packets traversing through the Internet and this in turn make it difficult to differentiate flood from genuine traffic.

Though botnet based approaches have been very effective for powerful DoS flood generation in the past, their future success will mainly depend on the continued availability of substantial number of compromised computers to form the botnet infrastructure. Recent prior arts have disclosed a number of systems, methods and apparatus to detect, track and rescue botnets in real time. For complete details of these prior arts, reference may be made to US patent application No. US20110154492 A1 entitled "Malicious traffic isolation system and method using botnet information" dated June 2012, US patent application No. US20120054869 A1 entitled "Method and apparatus for detecting botnets" dated March 2012, and U.S. Pat. No. 8,195,750 B1 entitled "Method and system for tracking botnets" dated June 2012, wherein widespread implementation and deployment of some of the techniques disclosed through the above referred prior arts might force the adversaries to explore more tactical flood generation strategy.

An alternate and more sophisticated flood generation strategy has gained attention in the recent past. In this case, instead of using compromised computers on the Internet for flood generation, standard features of communication protocol stack on remote computers are tactically exploited to force them to eject DoS flood. In this approach, the remote computer need not be compromised and no attack program needs to be explicitly installed or executed on it for flood generation. One such scenario was recently demonstrated in Stream Control Transmission Protocol (SCTP), a relatively new and highly promising transport layer protocol standardized by IETF (Internet Engineering Task Force). Reference may be made to IETF RFC 4960 "Stream Control Transmission Protocol", wherein complete specification of the SCTP is documented. In particular, reference may be made to the prior art entitled "Finding Protocol Manipulation Attacks" by authors Nupur Kothari et al. published in proceedings of ACM SIGCOMM-2011, Toronto wherein the authors have revealed that a greedy SCTP receiver can download files from a standard SCTP sender faster than genuine SCTP receivers through a technique called optimistic SACK (Selective Acknowledgement) spoofing. While this is an undesirable scenario leading to unfairness among competing SCTP flows, reference may be made to another prior art entitled "Feedback Manipulation Flood Attacks: Feasibility Evaluation and Impact Quantification on Stream Control Transmission protocol" by authors V. A. Kumar and D. Das published in the proceedings of ICITST-2012, London wherein the real potential of optimistic SACK spoofing for powerful and sustained DoS flood generation was systematically demonstrated through simulation and real-world experimentations. This is a next generation flooding strategy, which if practiced will have a huge security impact on the Internet.

It is important to highlight that though TCP continues to be the dominant connection oriented transport layer protocol on the Internet, SCTP is gaining popularity and emerging as a potential alternate to TCP. Today, SCTP is being deployed on the Internet because of its unique features such as multi-homing, multi-streaming, ability to preserve message boundaries, inbuilt protection against SYN-flood like attacks etc., which are not available in TCP. Most of the current generation public domain and commercial operating systems include SCTP as an integral part of the kernel along with socket API (Application Programming Interface) for application development. Though limited, there exist a number of client-server applications functional over SCTP including prototype implementations of Apache web server and Firefox web browser. SCTP has also demonstrated promising results as a transport layer protocol for transporting MPI (Message Passing Interface) messages in supercomputers involving massively parallel and densely interconnected hardware.

SCTP is considered as a next generation transport layer protocol on the Internet and more and more services that are currently available over TCP are expected to be migrated to SCTP in the near future. It is further important to highlight that optimistic SACK spoofing is not arising from any implementation flaws in SCTP, rather it originates from the protocol specification. Mere existence of standard implementation of SCTP servers is the only pre-requirement for launching optimistic SACK spoofing based attacks. Hence there is an urgent need to devise mechanism to detect and eliminate optimistic SACK spoofing in SCTP and thereby make this promising protocol robust to SACK spoofing attacks.

Optimistic SACK spoofing in SCTP is relatively new and could be tactically exploited to constitute sophisticated attack scenarios. Its feasibility and associated threats were revealed during the year 2011 to 2012. To the best of our knowledge, there is no prior art for detection and elimination of optimistic SACK spoofing and associated DoS attacks in SCTP. Reference may be made to the prior art EP1463265B1 entitled "Method and apparatus for authenticating packet payloads via message authentication codes" dated January 2013, wherein it provides a method for authenticating packet payload via Message Authentication Code (MAC) to avoid malicious third party injecting or folding a false packet into a TCP connection. In that invention, the packet sending node computes a MAC of the packet based on a security key and a pseudo header with a pre-defined source and destination port fields and a pre-defined checksum value. The MAC is included as a part of the header of the packet being sent and the packet receiving node computes the MAC using the same secret key, pre-defined source and destination port fields and the predefined checksum value. If the two MAC values match, the packet is authenticated.

Reference may be made to another prior art EP2106095A1 entitled "Methods and device for enforcing network access control utilizing secure packet tagging", dated September 2009 wherein it discloses a method and device for enforcing network access control using secure packet tagging. In that invention, a packet sending end-point computes a secure hash using a previously negotiated secret key and the content of the packet being sent. The hash is sent to the receiving end-point by including it in the identification field of the IP packet header. The receiver performs the hash calculation using the same secret key and received packet content, and accepts the packet only if the two hash values match.

In both the inventions mentioned above, the main drawback is that the MAC or hash embedded in the packet is derived from the packet that is being sent, and these inventions are suitable only to authenticate a packet, by the packet receiver, to the extent that it is neither modified nor generated by a malicious third party on the network. Said in other words, these inventions are intended to test and ensure that packets sent by one end-point reaches the other end-point intact. The packet authentication schemes disclosed in these inventions and other prior arts cannot detect or eliminate optimistic SACK spoofing in which the SCTP receiver itself (not a third party) is malicious, and the malicious action is to tactically generate acknowledgements (in the forms of SACK packets) before receiving the data to exploit the SCTP data sender for DoS flood generation.

For detection and elimination of maliciously spoofed optimistic SACKs, a drastically different approach than disclosed in the prior arts is necessary. In particular, the SCTP communication protocol needs to be enhanced with a feedback mechanism in which the SACK generator enriches its SACKs with appropriate additional information derived from the SCTP sender's data and the SCTP data sender needs robust mechanism to validate, using the feedback, that the SACK received from the SCTP data receiver has indeed been generated by the SCTP data receiver only after receiving the corresponding data. This need is addressed by various embodiments and configurations of the present invention.

OBJECT OF THE INVENTION

The main object of the invention is to provide a method and device for categorizing a Stream Control Transmission Protocol (SCTP) receiver terminal as a malicious SCTP receiver terminal.

Additional object of the present invention is to provide method and system for detection and elimination of optimistic SACK spoofing based Denial-of-Service (DoS) and Distributed Denial-of-Service (DDoS) attacks on SCTP transmitter terminal through data enriched SACK.

SUMMARY OF THE INVENTION

Accordingly, the present invention provides a method for categorizing a Stream Control Transmission Protocol (SCTP) receiver terminal as a malicious SCTP receiver terminal generating spoofed optimistic SCTP selective acknowledgement (SACK) packet, comprising:
(a) receiving, by a transceiver of a SCTP receiver terminal, a SCTP data packet containing a data chunk within a SCTP association;
(b) generating, by a processor of the SCTP receiver terminal, a data enriched SCTP SACK packet, the data enriched SCTP SACK packet comprising a cumulative payload essence of all data chunks successfully received within the SCTP association; and
(c) transmitting, by the transceiver of the SCTP receiver terminal, the data enriched SCTP SACK packet for enabling categorization of the SCTP receiver terminal as a malicious SCTP receiver terminal.

In an embodiment, the method further comprises computing, by the processor of the SCTP receiver terminal, the cumulative payload essence of all data chunks successfully received.

In another embodiment of the present invention, computing the cumulative payload essence of all data chunks successfully received comprises:
(a) computing payload essences of all individual non-duplicate data chunks being acknowledged through the Cumulative TSN Ack (Cumulative Transmission Sequence Number Acknowledgement) field of the data enriched SACK packet; and
(b) computing a cumulative payload essence as a binary sum of the payload essences of all individual non-duplicate data chunks being acknowledged through the Cumulative TSN Ack field of the data enriched SACK packet.

In yet another embodiment of the present invention, the payload essence is computed using entire SCTP data packet consisting of common header and data chunk containing the payload.

In still another embodiment of the present invention, the payload essence is computed using the entire payload in the received data chunk.

In one more embodiment of the present invention, the payload essence is computed using a portion of the payload in the received data chunk.

In one another embodiment of the present invention, if the payload essence is computed using a portion of the payload in the received data chunk, particulars of the portion of the payload to be used for the computation is predetermined for a particular SCTP association.

In another embodiment of the present invention, the payload essence and the cumulative payload essence are in the form of binary sequence of size truncated to less than or equal to 32 bits.

In yet another embodiment of the present invention, computing the payload essence of an individual data chunk includes parsing the data payload of the data chunk.

In still another embodiment of the present invention, computing the payload essence includes obtaining the 32 bit Checksum contained in the common header of the received SCTP data packet.

In a further embodiment of the present invention, computing the payload essence of an individual data chunk includes computing the payload essence using any one of (a) Cyclic Redundancy Check (CRC); (b) Internet Checksum; or (c) message digest.

In one another embodiment of the present invention, the data enriched SCTP SACK packet generation is performed by placing the cumulative payload essence in the Verification Tag field of the SCTP SACK packet.

In a further embodiment of the present invention, the SCTP data packets having contiguous Transmission Sequence Number (TSN) are immediately considered for computing the payload essence.

In a further more embodiment, the method further comprises the step of storing a SCTP data packet for use at a future point in time for computation of the cumulative payload essence, if the TSN of the SCTP data packet is greater than the TSN of the highest contiguous SCTP data packet received within the association.

The present invention also provides a method for categorizing a Stream Control Transmission Protocol (SCTP) receiver terminal as a malicious SCTP receiver terminal generating spoofed optimistic SCTP selective acknowledgement (SACK) packet, comprising:
(a) transmitting, by a transceiver of a SCTP transmitter terminal, SCTP data packets containing data chunks within a SCTP association;
(b) receiving, by the transceiver of the SCTP transmitter terminal, a data enriched SCTP SACK packet from the SCTP receiver terminal, the data enriched SCTP SACK packet comprising a cumulative payload essence of all data chunks successfully received within the SCTP association;
(c) computing, by a processor of the SCTP transmitter terminal, a cumulative payload essence of all data chunks successfully transmitted within the SCTP association;
(d) comparing, by the processor of the SCTP transmitter terminal, the computed cumulative payload essence with the cumulative payload essence contained in the received data enriched SCTP SACK packet;
(e) detecting, by the processor of the SCTP transmitter terminal, the presence of spoofed optimistic SCTP SACK packet if the value of the computed cumulative payload essence is different from the value of the cumulative payload essence contained in the received data enriched SCTP SACK packet; and
(f) categorizing, by the processor of the SCTP transmitter terminal, the SCTP receiver terminal as a malicious SCTP receiver terminal based on the presence of spoofed optimistic SCTP SACK packet.

In an embodiment, the method further comprises discarding spoofed optimistic SCTP SACK packet to avoid further transmission of SCTP data packets in response to spoofed optimistic SACK packet.

In another embodiment, the method further comprises detecting optimistic SACK spoofing based Denial-of-Service (DoS) attack or optimistic SACK spoofing based Distributed Denial-of-Service (DDoS) attack upon detecting the presence of spoofed optimistic SCTP SACK packet.

In yet another embodiment, the method further comprises terminating the SCTP association with the SCTP receiver terminal in response to detecting optimistic SACK spoofing based Denial-of-Service (DoS) attack or optimistic SACK spoofing based Distributed Denial-of-Service (DDoS) attack.

In still another embodiment of the present invention, computing the cumulative payload essence of all data chunks successfully transmitted comprises:
(a) computing payload essences of all individual data chunks successfully transmitted and acknowledged through the Cumulative TSN Ack (Cumulative Transmission Sequence Number Acknowledgement) field of the received data enriched SACK packet; and
(b) computing a cumulative payload essence as a binary sum of the payload essences of all individual non-duplicate data chunks successfully transmitted and acknowledged through the Cumulative TSN Ack field of the received data enriched SACK packet.

In yet another embodiment of the present invention, the payload essence of all individual data chunks successfully transmitted is computed using entire SCTP data packet consisting of common header and data chunk containing the payload.

In a further embodiment of the present invention, the payload essence of all individual data chunks successfully transmitted is computed using the entire payload in the transmitted data chunk.

In a furthermore embodiment of the present invention, the payload essence of all individual data chunks successfully transmitted is computed using a portion of the payload in the transmitted data chunk.

In a still another embodiment of the present invention, if the payload essence is computed using a portion of the payload in the transmitted data chunk, particulars of the portion of the payload to be used for the computation is predetermined for a particular association.

In another embodiment of the present invention, the payload essence of all individual data chunks successfully transmitted and the cumulative payload essence are in the form of binary sequence of size truncated to less than or equal to 32 bits.

The present invention further provides a receiver terminal having a Stream Control Transmission Protocol (SCTP) based communication function, comprising:

a receiver for receiving a SCTP data packet containing a data chunk within a SCTP association;
a processor for generating a data enriched SCTP selective acknowledgment (SACK) packet, the data enriched SCTP SACK packet comprising a cumulative payload essence of all data chunks successfully received within the SCTP association; and
a transmitter for transmitting the data enriched SCTP SACK packet for enabling categorization of the SCTP receiver terminal as a malicious SCTP receiver terminal.

The present invention further provides a transmitter terminal having a Stream Control Transmission Protocol (SCTP) based communication function, comprising:
a transmitter for transmitting SCTP data packets containing data chunks within a SCTP association;
a receiver for receiving a data enriched SCTP selective acknowledgement (SACK) packet from a SCTP receiver terminal, the data enriched SCTP SACK packet comprising a cumulative payload essence of all data chunks successfully received within the SCTP association; and
a processor configured to compute a cumulative payload essence of all data chunks successfully transmitted within the SCTP association; compare the computed cumulative payload essence with the cumulative payload essence contained in the received data enriched SCTP SACK packet; detect the presence of spoofed optimistic SCTP SACK packet; and categorize the SCTP receiver terminal as a malicious SCTP receiver terminal based on the presence of spoofed optimistic SCTP SACK packet.

The present invention further provides a non-transitory computer-readable recording medium storing a computer program for executing a method for categorizing a Stream Control Transmission Protocol (SCTP) receiver terminal as a malicious SCTP receiver terminal generating spoofed optimistic SCTP selective acknowledgment (SACK) packet, comprising:
(a) receiving, at a SCTP receiver terminal, a SCTP data packet containing a data chunk within a SCTP association;
(b) generating, at the SCTP receiver terminal, a data enriched SCTP SACK packet, the data enriched SCTP SACK packet comprising a cumulative payload essence of all data chunks successfully received within the SCTP association; and
(c) transmitting, at the SCTP receiver terminal, the data enriched SCTP SACK packet for enabling categorization of the SCTP receiver terminal as a malicious SCTP receiver terminal.

The present invention further provides a non-transitory computer-readable recording medium storing a computer program for executing a method for categorizing a Stream Control Transmission Protocol (SCTP) receiver terminal as a malicious SCTP receiver terminal generating spoofed optimistic SCTP selective acknowledgement (SACK) packet, comprising:
(a) transmitting, by a SCTP transmitter terminal, SCTP data packets containing data chunks within a SCTP association;
(b) receiving, at the SCTP transmitter terminal, a data enriched SCTP SACK packet from the SCTP receiver terminal, the data enriched SCTP SACK packet comprising a cumulative payload essence of all data chunks successfully received within the SCTP association;
(c) computing, at the SCTP transmitter terminal, a cumulative payload essence of all data chunks successfully transmitted within the SCTP association;
(d) comparing, at the SCTP transmitter terminal, the computed cumulative payload essence with the cumulative payload essence contained in the received data enriched SCTP SACK packet;
(e) detecting, at the SCTP transmitter terminal, the presence of spoofed optimistic SCTP SACK packet if the value of the computed cumulative payload essence is different from the value of the cumulative payload essence contained in the received data enriched SCTP SACK packet; and
(f) categorizing, at the SCTP transmitter terminal, the SCTP receiver terminal as a malicious SCTP receiver terminal based on the presence of spoofed optimistic SCTP SACK packet.

The present invention provides a system having a Stream Control Transmission Protocol (SCTP) based communication function, comprising:
a SCTP receiver terminal configured to:
  receive a SCTP data packet containing a data chunk within a SCTP association;
  generate a data enriched SCTP selective acknowledgement (SACK) packet, the data enriched SCTP SACK packet comprising a cumulative payload essence of all data chunks successfully received within the SCTP association; and
  transmit the data enriched SCTP SACK packet for enabling categorization of the SCTP receiver terminal as a malicious SCTP receiver terminal; and
a SCTP transmitter terminal configured to:
  transmit SCTP data packets containing data chunks within a SCTP association;
  receive a data enriched SCTP SACK packet from the SCTP receiver terminal, the data enriched SCTP SACK packet comprising a cumulative payload essence of all data chunks successfully received within the SCTP association;
  compute a cumulative payload essence of all data chunks successfully transmitted within the SCTP association;
  compare the computed cumulative payload essence with the cumulative payload essence contained in the received data enriched SCTP SACK packet;
  detect the presence of spoofed optimistic SCTP SACK packet if the value of the computed cumulative payload essence is different from the value of the cumulative payload essence contained in the received data enriched SCTP SACK packet; and
  categorize the SCTP receiver terminal as a malicious SCTP receiver terminal based on the presence of spoofed optimistic SCTP SACK packet.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE ACCOMPANYING DRAWINGS

These and other features, aspects, and advantages of the present invention will become better understood when the following detailed description is read with reference to the accompanying drawings in which like characters represent like parts throughout the drawings, wherein.

Figure 1:
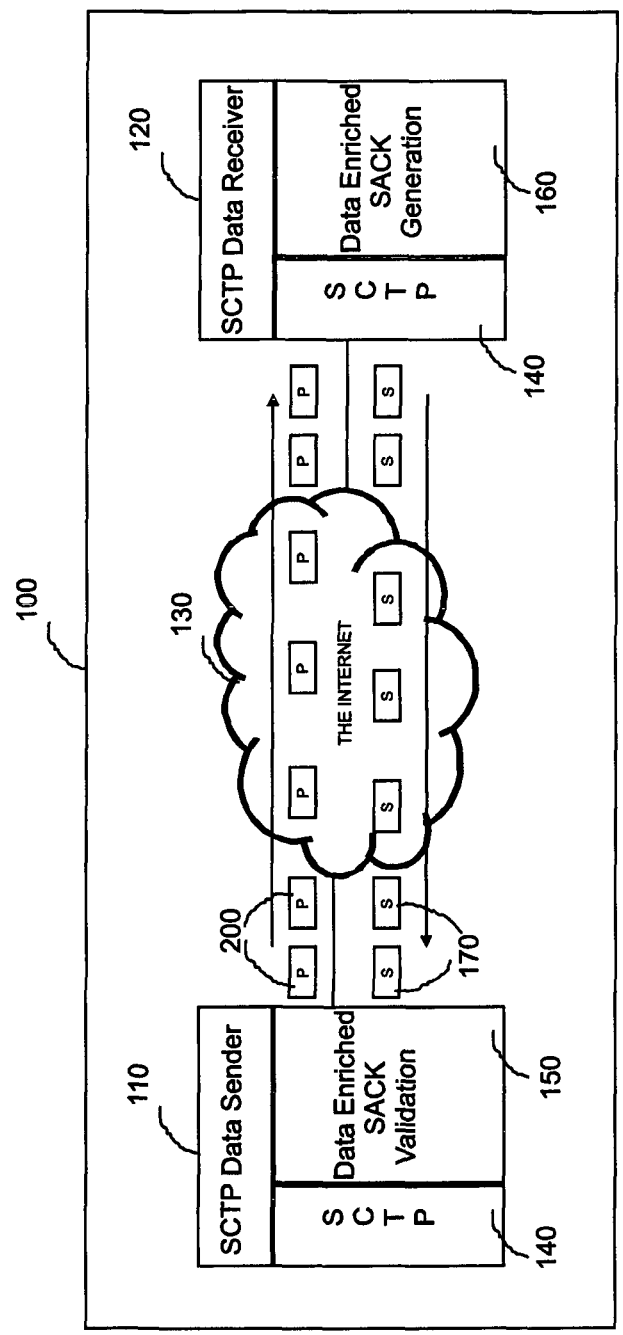
FIG. 1 represents a typical communication scenario in which the invention is applicable.

Further, skilled artisans will appreciate that elements in the drawings are illustrated for simplicity and may not have been necessarily been drawn to scale. For example, the dimensions of some of the elements in the drawings may be exaggerated relative to other elements to help to improve understanding of aspects of the present invention. Furthermore, the one or more elements may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof. Throughout the patent specification, a convention employed is that in the appended drawings, like numerals denote like components.

Reference throughout this specification to "an embodiment", "another embodiment" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Wherever the definition of terms deviates from the commonly used meaning of the term, the applicant intends to use the definitions provided below.

For the purpose of the present invention, the term "SCTP" or "Stream Control Transmission Protocol" refers to the transport layer protocol defined and standardized by the Internet Engineering Task Force (IETF).

The term "SCTP transmitter terminal" or "SCTP data sender" refers to a device consisting of both hardware and operating system with TCP/IP (Transmission Control Protocol/Internet Protocol) protocol stack including the SCTP built into it, and capable of transmitting SCTP data packets and receiving SCTP SACK packets including data enriched SCTP SACK packets through a communication network.

The term "SCTP receiver terminal" or "SCTP data receiver" refers to a device consisting of both hardware and operating system with TCP/IP protocol stack including the SCTP built into it, and capable of receiving SCTP data packets and transmitting SCTP SACK packets including data enriched SCTP SACK packets through a communication network.

The term "SCIP association" refers to a-unique protocol level relationship between a SCTP dad sender and a SCTP data receiver as defined in the IETF RFC (Request for Comments) 4960. Any communication between a SCTP data sender and a SCTP data receiver can take place only after establishing a successful association between them.

The term "TSN" (Transmission Sequence Number) refers to the 32 bit binary number placed in the TSN field of the SCTP data packet generated by the SCTP data sender. The term "Cumulative TSN Ack" refers to the 32 bit binary number placed in the Cumulative TSN Ack field of the SCTP data enriched SACK (selective acknowledgement) generated by the SCTP data receiver to acknowledge the reception of the data packet identified by the TSN.

The term "spoofed optimistic SACK" or "optimistically spoofed SCTP SACK" refers to a SCTP SACK packet generated by a SCTP data receiver or a SCTP receiver terminal in which the Cumulative TSN Ack field of the SACK packet is set with a 32 bit binary number whose value is higher than the highest TSN of the data packet that the SCTP receiver has received within the SCTP association.

The term "optimistic SACK spoofing based Denial-of-Service attacks" refers to flooding Denial-of-Service attacks in which flood generation is achieved through spoofed optimistic SACK packets. Said in other words, these are Denial-of-Service attacks in which optimistically spoofed SACK packets are used as the building blocks for flood generation.

The term "optimistic SACK spoofing" refers to a scenario in which a SCTP data receiver generates and sends one or more spoofed optimistic SACK packets to the SCTP data sender to which the SCTP data receiver has an established association.

The term "data enriched SACK" or "data enriched SCTP SACK" refers to a SACK packet generated by a SCTP data receiver and sent to a SCTP data sender to acknowledge the reception of one or more SCTP data packets at the SCTP data receiver. The data enriched SACK contains a fixed size Cumulative Payload Essence of SCTP data packets received within the association. The term "Cumulative Payload Essence" refers to the binary sum of the payload essences of all the data packets cumulatively acknowledged by the Cumulative TSN Ack field of the data enriched SACK.

The term "payload essence" refers to a fixed size sequence of binary digits obtained from a SCTP data packet. The payload essence may be obtained using an entire SCTP data packet containing the common header and SCTP data chunk or it may be obtained using a subset of information contained in the SCTP data packet. It is mandatory that for obtaining the payload essence, at least a portion of the payload or user data in the SCTP data packet should be used.

The term "payload" refers to the user data or application data in a SCTP packet excluding the SCTP protocol header.

The term "contiguous in sequence" refers to a state of the SCTP data receiver in which it receives a SCTP data packet satisfying the condition that all other SCTP data packets with TSN number less than the currently received data packet have already reached the SCTP data receiver.

The term "message digest" refers to the binary sequence obtained as described in IETF RFC 1319 or IETF RFC 1320 or IETF RFC 1321. It also includes any portion of the obtained binary sequence, which is truncated to a size of 32 bits or less.

The term "Cyclic Redundancy Check" (CRC) refers to the 32 bit CRC32c checksum obtained as described in IETF RFC 4960.

The term "Internet checksum" refers to the binary sequence obtained as described in IETF RFC 1624 or IETF RFC 1141 or IETF RFC 1071.

FIG. 1 is a block diagram that schematically illustrates a communication network 100 in accordance with the embodiment of the present invention. The network comprises of a SCTP data sender 110, also referred as SCTP transmitter terminal, and a SCTP data receiver 120, also referred as SCTP receiver terminal, each of them comprises SCTP communication protocol 140 at their respective transport layers. The SCTP on the data receiver includes a new data enriched SACK generation module 160, which generates and sends data enriched SACK 170 and the SCTP on the data sender includes a new data enriched SACK validation module 150 for validating the data enriched SACK received from the SCTP data receiver. In this invention, the SCTP data sender and the receiver together form a 'data enriched SACK aware' SCTP communication system.

The SCTP data sender 110 and receiver 120 can include a computing device and a set of instructions that can be executed to cause the computing device to perform any one or more of the methods disclosed. The computing device may operate as a standalone device or may be connected, e.g., using a network, to other computer systems or peripheral devices.

In a networked deployment, the computing device may operate in the capacity of a server or as a client subscriber computer in a server-client subscriber network environment, or as a peer computer in a peer-to-peer (or distributed) network environment. The computing device can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computing device is mentioned, the term "system" shall also be taken to include any collection of systems or sub-systems that individually or jointly execute a set, or multiple sets, of instructions to perform one or more computing functions.

The SCTP data sender 110 and receiver 120 can include a processor, e.g., a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processor may implement a software program, such as code generated manually (i.e., programmed).

The SCTP data sender 110 and receiver 120 can include a memory, such as a memory that can communicate via a bus. The memory may be a main memory, a static memory, or a dynamic memory. The memory may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory includes a cache or random access memory for the processor. In alternative examples, the memory is separate from the processor, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by the processor. The functions, acts or tasks illustrated in the figures or described may be performed by the programmed processor executing the instructions stored in the memory. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The SCTP data sender 110 and the receiver 120 communicate each other over a packet switched Wide Area Network (WAN), typically the Internet 130. The data sender 110 sends application data to the receiver in the form of prior art SCTP data packets 200 containing one or more data chunks. Upon receiving the data packets from the SCTP data sender, the SCTP data receiver acknowledges the reception of the data packets by sending SCTP data enriched SACK packets 170. Both SCTP data packet and data enriched SACK packet are typically encapsulated inside IP (Internet Protocol) packet so that they can traverse through the Internet. The data enriched SACK 170 presented in this invention is novel and it is different from the SCTP SACK disclosed in prior art IETF RFC 4960 "Stream Control Transmission Protocol". The format of data enriched SACK and the methodology for its generation are explained in detail at a later part of this art.

The sender 110 could be a webserver providing http service over SCTP (http over SCTP) to its web clients and the receiver 120 could be one of the web clients. In this context, the communication refers to http based data download by the receiver from the sender. There can be multiple similar scenarios in which various other current and future application layer services on the Internet can use SCTP as the transport layer protocol for reliable end-to-end packet delivery. It is worth noting here that an application, which uses SCTP as the transport mechanism, instead of TCP, will benefit from several unique features of SCTP such as multi-homing, multi-streaming, enhanced security features etc., which are not currently available through TCP.

Irrespective of the applications deployed over SCTP, the SCTP data receiver 120 could have a malicious intention. As mentioned in the background section of this art, if the SCTP data sender and receiver use the prior art SCTP as standardized by IETF RFC 4960, the SCTP data receiver can practice optimistic SACK spoofing. Recent prior arts have revealed that optimistic SACK spoofing can cause potential negative impact on the SCTP sender as well as the upstream network to which the sender is connected. In particular, the prior art entitled "Finding Protocol Manipulation Attacks" showed that a greedy SCTP data receiver could exploit the optimistic SACK spoofing technique to download data from a SCTP data sender much faster than normal receivers. When multiple competing SCTP flows pass through a common bottleneck link, this can create an unfair scenario in which the greedy receiver takes an undue share of bottleneck bandwidth at the cost of well behaving receivers. On the other hand, a much more worrisome and potentially dangerous threat associated with optimistic SACK spoofing was revealed in a more recent prior art entitled "Feedback Manipulation Flooding Attack: Feasibility Evaluation and Impact Quantification on Stream Control Transmission Protocol". The above prior art established that through optimistic SACK spoofing technique, a malicious SCTP receiver could exploit a SCTP sender as flood source for launching sustained and powerful DoS attack. Further, if this technique is exploited in a distributed manner with involvement of multiple SCTP senders and multiple malicious SCTP receivers, there is a potential risk of congestion collapse on the Internet.

This invention provides a remedy to the threat posed by SCTP receiver through optimistic SACK spoofing, which is explained in detail at a later part of this art. In particular, using the data enriched SACK generation and validation techniques presented in this invention, an SCTP data sender can detect maliciously spoofed optimistic SACKs and eliminate attacks and exploitations based on optimistic SACK spoofing.

Figure 2:
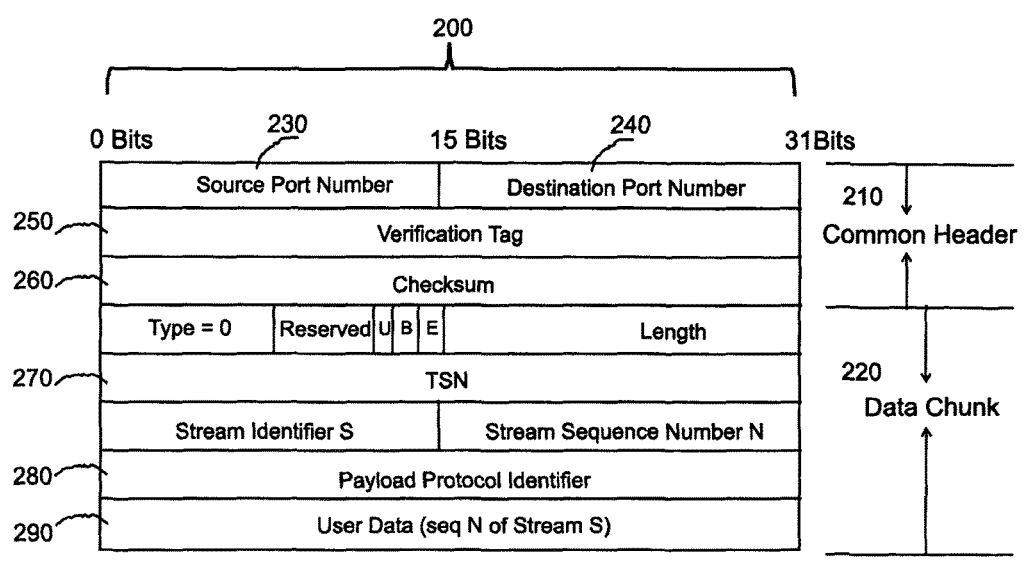
FIG. 2 represents the IETF standardized SCTP data packet format consisting of a common header and data chunk.

Reference is now made to FIG. 2 which provides complete format of prior art SCTP data packet 200 standardized by the IETF RFC 4960 "Stream Control Transmission Protocol". It consists of a SCTP common header 210 and data chunk 220. The common header 210 further consists of a 16 bit Source Port Number 230, a 16 bit Destination Port Number 240, 32 bit Verification Tag 250 and a 32 bit Checksum 260. The Source Port Number 230 and Destination Port Number 240 are used to uniquely identify the SCTP association and correctly map SCTP packets to the association. The Verification Tag provides protection against blind masquerade attacks and against stale SCTP packets from a previous association, if any. The Verification Tag of packets (data and SACK) originating from one endpoint and bound to its peer should contain the Initiate Tag received from the peer during the associating setup. The Checksum 260 contains the 32 bit CRC (Cyclic Redundancy Check) of the entire SCTP packet and is used to detect and discard packets in which bit error occurs during transmission. The data chunk contains a 32 bit TSN (Transmission Sequence Number) 270 and a User Data or payload 290, whose size is in multiple of 32 bits and can go up to the MTU (Maximum Transfer Unit) of the end-to-end network path used for the SCTP communication. The application data to be transported from the SCTP data sender to the data receiver is placed in the payload 290 and the data is identified through the unique 32 bit TSN 270. The SCTP data sender uses TSN to detect packet loss, if any, and to retransmit lost packet. On the other hand, the SCTP data receiver uses TSN to acknowledge the successful reception of data as well as to detect arrival of duplicate data packets. Other fields of the data chunk are not explicitly mentioned here as they are not relevant to this art.

Figure 3:
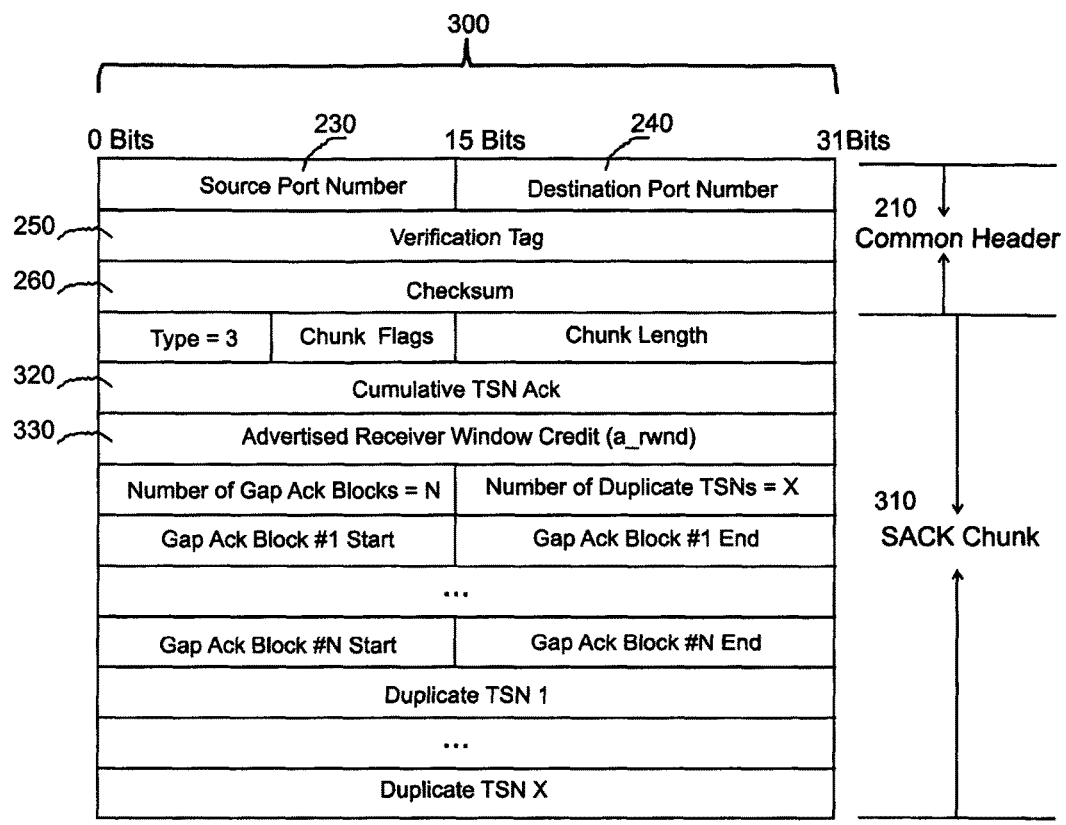
FIG. 3 represents the IETF standardized SACK packet format consisting of a common header and SACK chunk.

FIG. 3 provides the complete format of the SCTP SACK packet 300 in prior art, IETF RFC 4960. It consists of a common header 210 with same format of the common header of SCTP data packet and a SACK chunk 310. Being a control packet, SCTP SACK does not contain any user data or payload. The SACK chunk consists of a 32 bit Cumulative TSN Ack 320 and a 32 bit Advertised Receiver Window Credit (a_rwnd) 330. Other fields of the SACK chunk are not explicitly mentioned here as they are not relevant to this art. The Cumulative TSN Ack 320 is used to acknowledge the TSN of data packets received in sequence and without any gap by the SCTP data receiver. It is a cumulative value meaning that acknowledging a TSN indicates that all data packets up to and including the TSN has been received by the data receiver. The Advertised Receiver Window Credit 330 is used for flow control and its value indicates the receive buffer space (memory) in bytes available at the SCTP data receiver to receive and process data from the SCTP data sender. The SCTP data sender is not supposed to send more bytes than allowed by the a_rwnd as the additional data received will have to be eventually dropped at the data receiver due to lack of buffer space.

It is important to mention at this stage that throughout this art, the term SCTP 'packet' and SCTP 'chunk' are used interchangeably. However, those who are familiar with the SCTP prior art will note the subtle difference between them. A SCTP packet is the format of data delivery between the SCTP protocol at the transport layer and the layer below it (IP layer). A SCTP packet contains a common header and one or more SCTP chunks in it. Whenever the term SCTP data packet is used, it implies a SCTP packet with a SCTP data chunk in it. Similarly, the term SCTP SACK packet implies a SCTP packet with a SACK chunk inside it. IETF RFC 4960 defines multiple SCTP control chunks, which include data chunk, SACK chunk, INIT chunk, INIT ACK chunk, SHUTDOWN chunk, ABORT chunk etc.

Figure 4:
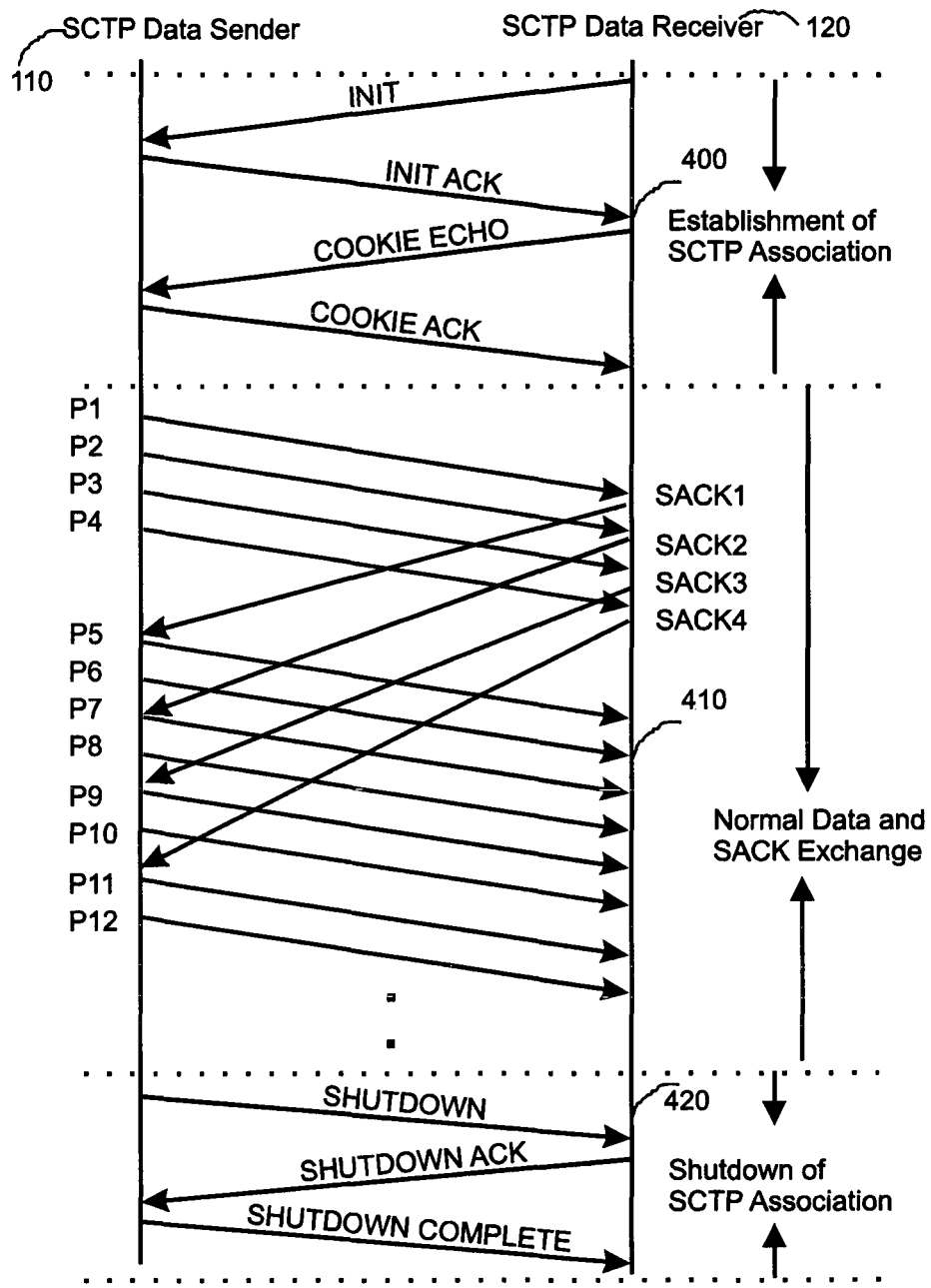
FIG. 4 represents three distinct phases namely Establishment of SCTP Association, Data and SACK Exchange and Shutdown of SCTP Association involved in a typical SCTP based data transfer from the sender to the receiver. In particular, it shows the interdependency between SACK and data packets and the role of SACK packets in sending out new data packets during the data transfer phase.

Attention is now focused on explaining the sequence of interaction at packet level between a SCTP data sender and a data receiver during a normal prior art SCTP data transfer, and how a malicious receiver can incorporate optimistic SACK spoofing into it. Reference is first made to FIG. 4, which shows a typical application data transfer over SCTP. Being a connection oriented, reliable end-to-end transport layer protocol, the data transfer invariably involves three distinct phases in order: (a) Establishment of SCTP association 400 between the two endpoints (SCTP data sender and SCTP data receiver) through the four-way handshake process, (b) Data and SACK exchange 410, which consists of encapsulation and transmission of application data in the form of SCTP data packets by the SCTP sender and acknowledging the reception of the data by the receiver through the SACK packets, and (c) Shutdown of SCTP association 420 to release resources reserved (e.g. memory, CPU etc.) for serving the particular association once the application data transfer is completed.

The association establishment further consists of one endpoint (SCTP data receiver in FIG. 4) sending an INIT packet, the other endpoint (SCTP data sender in FIG. 4) responding back with an INIT ACK packet and subsequent exchange of COOKIE ECHO and COOKIE ACK packets between the endpoints. Both the INIT and INIT ACK packets play a crucial role by exchanging important parameters between endpoints, which are subsequently used as headers for creation of all SCTP packets belonging to the association. These parameters include, apart from other protocol fields, the 16 bit Source Port Number, the 16 bit Destination Port Number, a 32 bit random number as the Initial TSN and another 32 bit random number called Initiate Tag.

Once an SCTP association is established, the actual application data transfer 410 begins. The SCTP data sender 110 sends a fixed number of data packets to the SCTP data receiver 120. The number of fixed packets send out depends on the initial value of the congestion window (ICWND) of the SCTP data sender. The typical value of ICWND is 4 packets (4 times MTU bytes) as per section 7.2.1 "Slow-Start" of IETF RFC 4960 "Stream Control Transport Protocol". The data packets are prepared as per the format 200 in FIG. 2. Each data packet has a unique TSN number, which is derived from the Initial TSN of the SCTP data sender. For example, if the initial TSN of the data sender is N, the TSN of the first, second, third and so on data packets will be N, N+1, N+2 and so on. For simplicity, FIG. 4 is drawn by assuming N=1, and the number shown next to each data packet is its TSN. Thus the first data packet, P1, has a TSN of 1 and second data packet, P2, has a TSN of 2 and so on. Once the data packets are sent out, the data sender waits for the arrival of SACK packets acknowledging the successful reception of data at the receiver. When the data packets reach the receiver, it acknowledges the data by sending SACK packets with Cumulative TSN Ack field containing the TSN of highest in sequence data packet successfully received. For example, the value of Cumulative TSN Ack of SACK packets that acknowledge the first, second, third and so on data packets will be 1, 2, 3 and so on. When SACK packets acknowledging new data packets arrive at the SCTP data sender, the sender performs flow and congestion control as per section 7 "Congestion Control" of IETF RFC 4960 and sends out new data packets. For example, as shown in FIG. 4, arrival of the first SACK packet, SACK1, at the data sender triggers two new data packets, P5 and P6, and arrival of the second SACK packet, SACK2, triggers another two new data packets, P7 and P8. The data and SACK packet exchange typically continue until the sender sends all the data and the receiver acknowledges them. Finally, when the data transfer is completed, the association termination 420 as shown in FIG. 4 is performed through the exchange of SHUTDOWN, SHUTDOWN ACK and SHUTDOWN COMPLETE packets.

Figure 5:
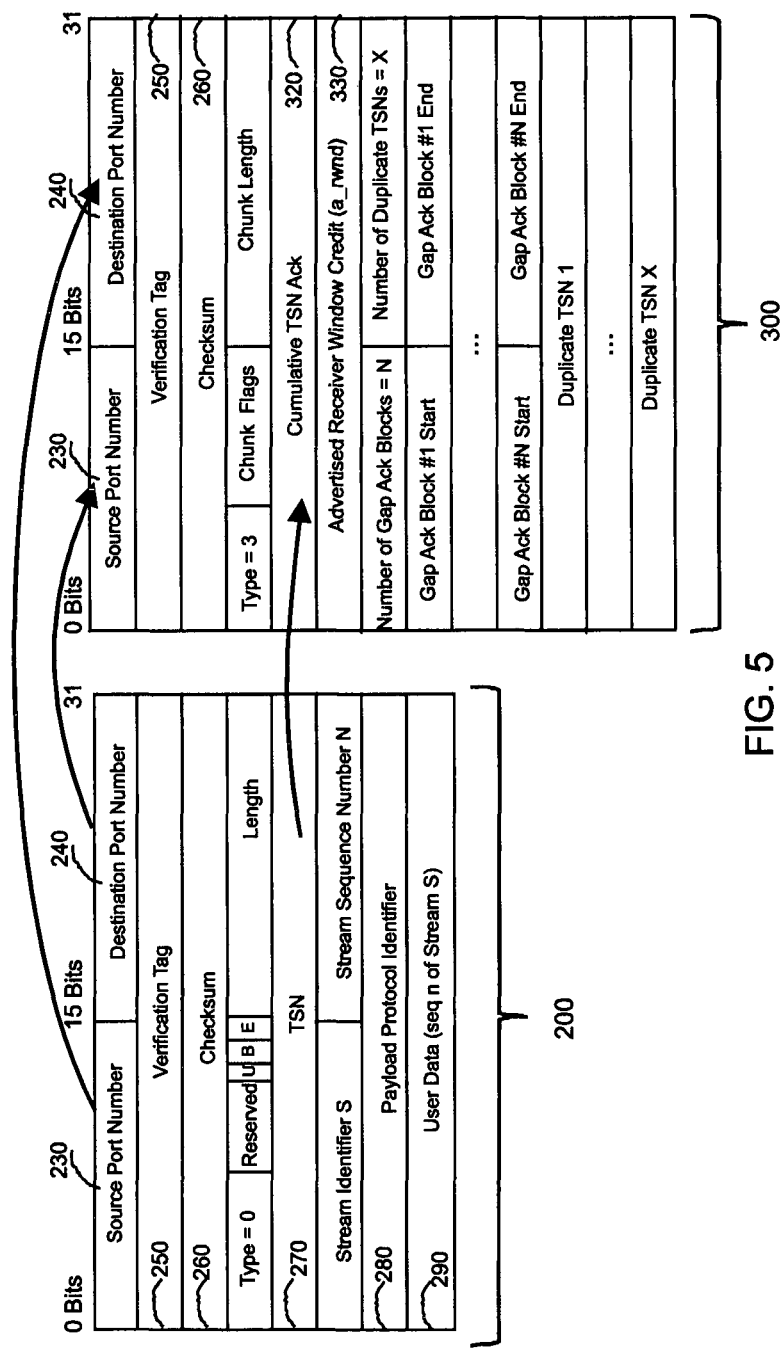
FIG. 5 represents conventional SACK generation process from the Data.

Reference is now made to FIG. 5, which illustrate the typical way of deriving a SCTP SACK packet 300 from a data packet 200 that need to be acknowledged through the SACK. The Source Port Number 230 of SACK packet is same as the Destination Port Number 240 of the data packet. Likewise, the Destination Port Number 240 of the SACK packet is same as the Source Port Number 230 of data packet. The source and destination port numbers remain constant throughout the association and these numbers are mutually decided at the time of association setup. The Verification Tag of the SACK also remains constant throughout the association and its value (the Initiate Tag received from the SCTP data sender) is also decided during association setup. The only field that changes in the SACK with respect to the incoming data packet is Cumulative TSN Ack and its value is same as the TSN in the common header of the incoming data packet being acknowledged. The values of the remaining fields in the SACK are purely receiver governed and hence can be decided by the SCTP data receiver (SACK generator) unilaterally.

It is important to note from the above description that arrival of data packets at the SCTP data receiver triggers SACK packets and arrival of the SACK packets at the SCTP data sender triggers additional data packets. Further and more importantly, most of the information required for SACK generation is static with respect to a given association and they are readily available as soon as the association setup is completed. Though the Cumulative TSN Ack of SACK is dynamic and varies according to the TSN of successfully received data packets, its value can be predicted easily. If the initial TSN of the SCTP sender in an association is N, the TSN of the first data packet will be N, and the TSN of each subsequent data packet will be incremented by one. Optimistic SACK spoofing receiver tactically uses this information to generate and send valid SACK without actually receiving the data packet that is being acknowledged. In fact, the receiver sends SACK packets acknowledging data packets, which are expected from the sender in response to its previous SACKs. At the SCTP sender side, each SACK is valid as it acknowledges new data that the sender has previously sent. Hence, they are used to increment the congestion window (cwnd) of the sender and to send out new data packets, which constitute the actual flood.

Figure 6:
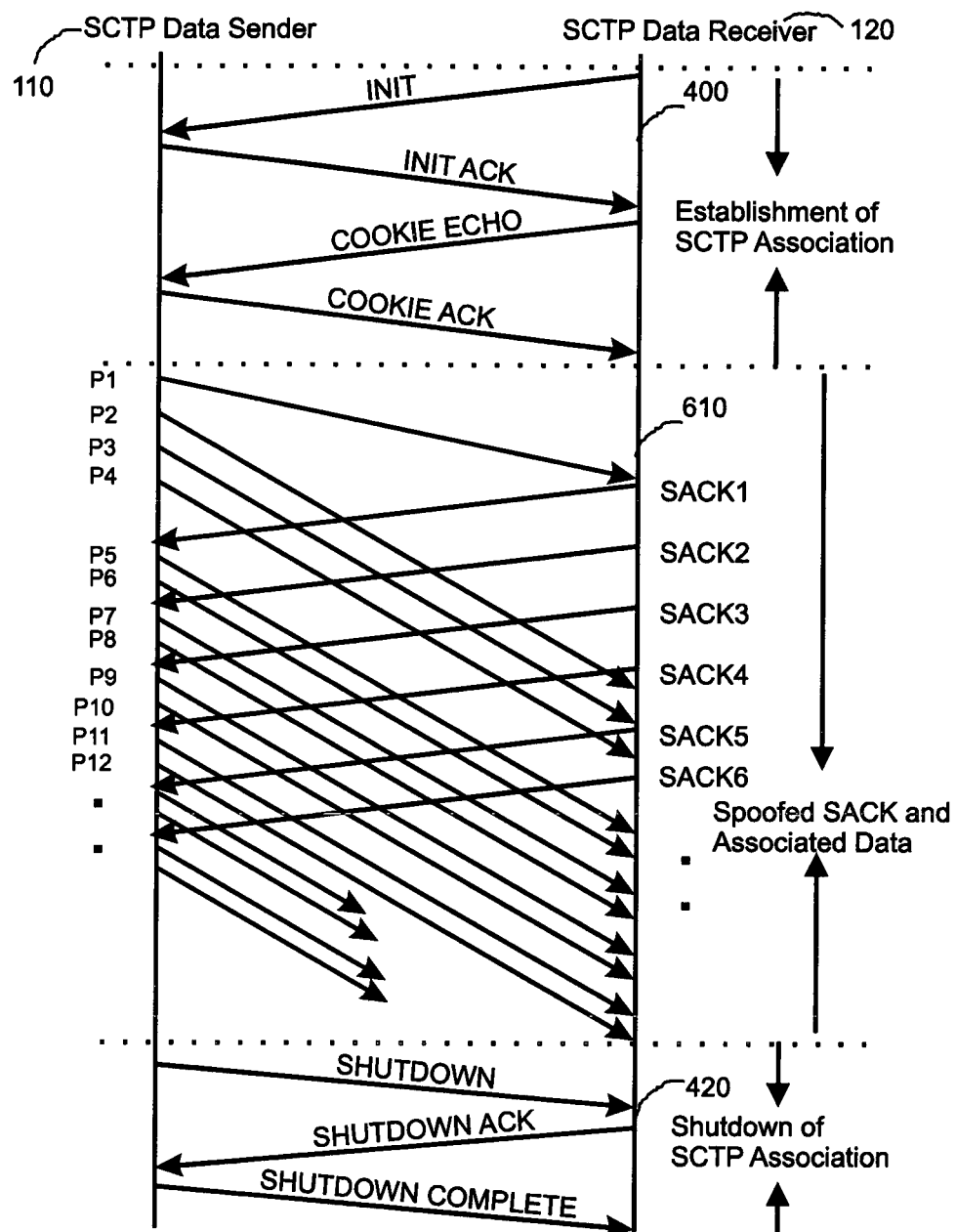
FIG. 6 represents a typical case of SCTP data sender exploitation for flood generation through optimistic SACK spoofing in which the SCTP data receiver manipulates the Cumulative TSN Ack field of the SACK packet.

Reference is now made to FIG. 6 to provide one illustrative example of a SCTP data receiver 120 exploiting a standard SCTP data sender 110 for DoS flood generation. The establishment of association 400 and shutdown of association 420 shown in FIG. 6 are exactly same as those in normal scenario shown in FIG. 4. For easy representation, FIG. 6 is drawn with the assumption that the Initial TSN of the data sender is 1. The TSN of each data packet is shown next to it. For example, the first data packet, P1, has a TSN of 1 and second data packet, P2, has a TSN of 2 and so on. Likewise, for each SACK packet, its Cumulative TSN Ack is shown next to it. Upon receiving the first data packet, P1, the SCTP data receiver sends a SACK packet, SACK1, in which the Cumulative TSN Ack field is the TSN of the received data packet. Further, the SCTP receiver sends a series of SACK packets in which the Cumulative TSN Ack field of each SACK is incremented by one. These SACK packets are marked as SACK2, SACK3, SACK4 etc. in FIG.

6 and are optimistically spoofed SACKs. Though these SACKs are generated before receiving the corresponding data packets, they are valid SACKs for the SCTP data sender 110 and hence they trigger new data packets, P5, P6, P7, P8, P9, P10, P11, P12 etc. These data packets have the required characteristics of a DoS flood. The flood rate can be remotely controlled by varying the inter SACK time gap among the spoofed SACKs.

Figure 7:
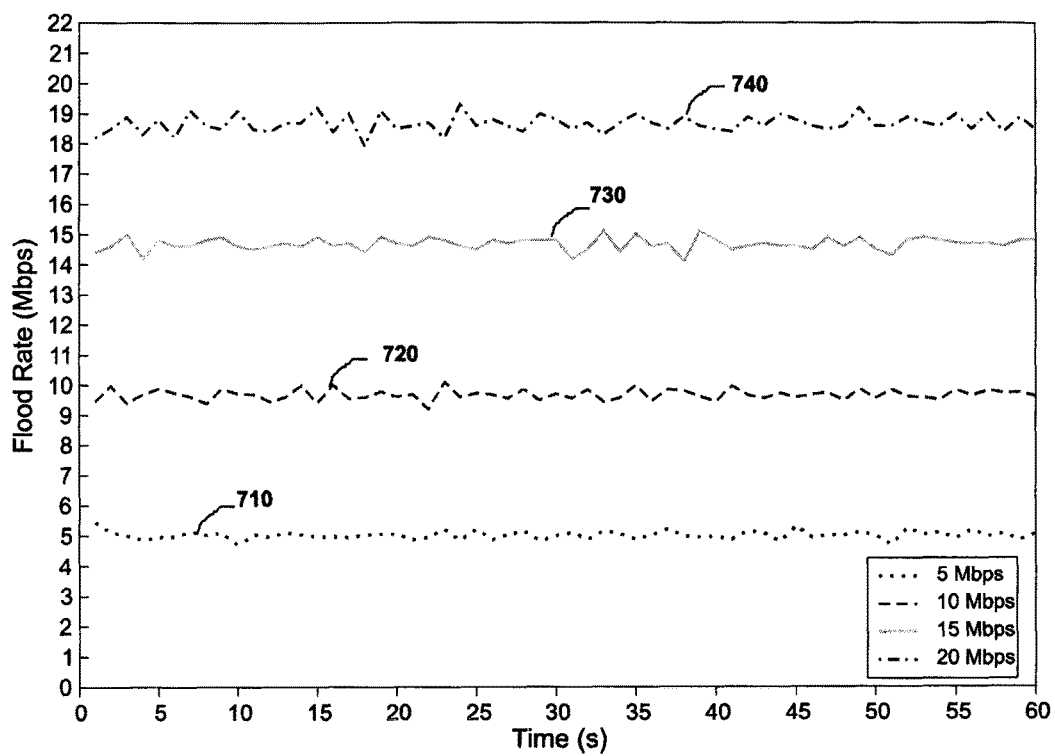
FIG. 7 represents a real-world experimental result on DoS flood generation through optimistic SACK spoofing in SCTP.

FIG. 7 gives four representative results from a series of real-world experimentations conducted over the Internet as part of this art for demonstrating the feasibility of flood generation through optimistic SACK spoofing. The experimental setup and values of parameters used are described in detail in Example-1, which is given at a later part of this art. The four plots in FIG. 7 show the time verses flood rates (number of bits per second) ejected by the SCTP data sender in response to spoofed optimistic SACK packets generated by the SCTP data receiver. The first plot 710 shows a scenario in which the inter SACK time gap is adjusted to force the sender to transmit at a rate of 5 Mbps. Several additional experiments were conducted by changing the time interval among spoofed optimistic SACK packets, which in turn results in different flood rate. The second plot 720, the third plot 730 and the fourth plot 740 show scenarios in which the sender is forced to eject flood of 10 Mbps, 15 Mbps and 20 Mbps.

The invention identifies and solves a fundamental limitation of the SACK generation process, which makes the optimistic SACK spoofing and associated DoS flood generation feasible. While a SACK sent by a data receiver with Cumulative TSN Ack, say N, inform the sender that the receiver has successfully received all data packets of TSN N and below, the SACK does not contain required information for the sender to validate the data receiver's claim. The Cumulative TSN Ack of SACK cannot be used for validating receiver's claim as it can be predicted and manipulated by the data receiver as explained above and demonstrated experimentally in FIG. 7. According to this invention, SACK should be enriched with solid information and the data sender should use this information to validate the data receiver's claim before accepting and further processing the SACK. According to this invention, the solid information for enriching the SACK is obtained from the application payload of the data packet, which triggers the SACK packet. Thus, the data enriched SACK presented in this invention contains an essence of the application payload in the data packet and this eliminates the feasibility of generating SACK before receiving the data.

Figure 8:
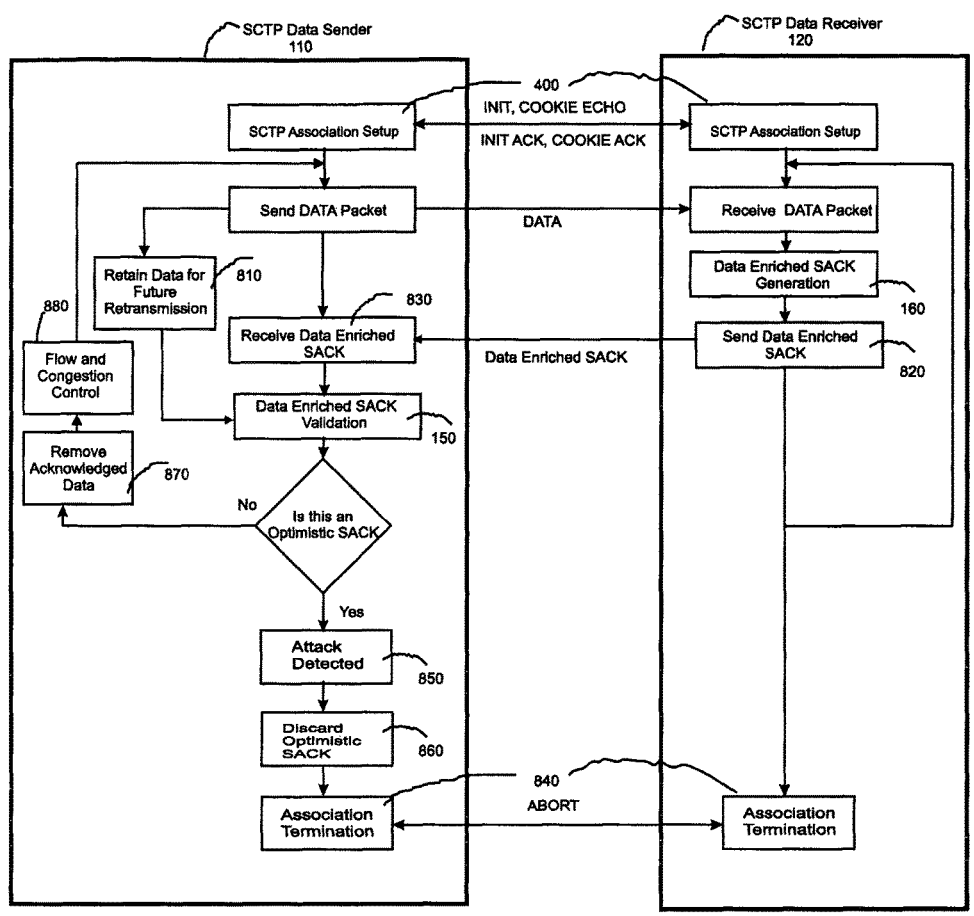
FIG. 8 represents sequence of interaction between the SCTP data sender and SCTP data receiver in the invention.

Reference is now made to FIG. 8, which depicts the sequence of interaction between the SCTP data sender 110 and the SCTP data receiver 120 in accordance with one of the embodiments of the present invention. The SCTP data sender 110, after establishing the SCTP association 400, sends data packets to the SCTP data receiver 120 and retains them for future retransmission 810 in the event of non reception of acknowledgement due to packet loss or corruption in the network. The data packets are prepared as per the format 200 in FIG. 2, which is in accordance with the section 3.3.1 "Pay Load Data" of IETF RFC 4960. Once the data packets are sent out, the data sender 110 waits for the arrival of SACK packets acknowledging the reception of data at the data receiver 120.

When the data packets reach the SCTP data receiver 120, it applies the acknowledgement generation rule in sections 6.2 "Acknowledgement on receipt of data" of IETF RFC 4960. In particular, the receiver decides whether the data packets need to be acknowledged immediately or delayed in accordance with the section 4.2 "Generating Acknowledgement" of IETF RFC 2581, and determines the TSN to be acknowledged through the Cumulative TSN Ack field of the SACK packet as per section 3.3.4 "Selective Acknowledgement" of IETF RFC 4960.

According to one embodiment of this invention, once the SCTP data receiver 120 decide to send a SACK packet to the SCTP data sender 110, the data enriched SACK generation module 160 generates a data enriched SACK instead of a normal SACK of format described in prior art IETF RFC 4960. The data enriched SACK presented in this invention contains a fixed size Cumulative Payload Essence. The Cumulative Payload Essence is derived or computed from all the data packets that are acknowledged by the data receiver through the Cumulative TSN Ack field of the SACK. The objective is to communicate the Cumulative Payload Essence back to the SCTP data sender as a feedback. It is important to note that a genuine SCTP data receiver will not be able to generate a correct Cumulative Payload Essence unless it really receives all the data packets, which are acknowledged through the Cumulative TSN Ack field of the SACK. This enables the SCTP data sender to effectively use the Cumulative Payload Essence to detect and eliminate maliciously spoofed optimistic SACK by the SCTP data receiver. It is important to highlight that a SACK carrying a Cumulative TSN Ack, for example N, acknowledges all data packets of TSN up to and including N. Thus, the Cumulative Payload Essence invariably represents all data that the receiver has received and acknowledged so far within the association.

Figure 9:
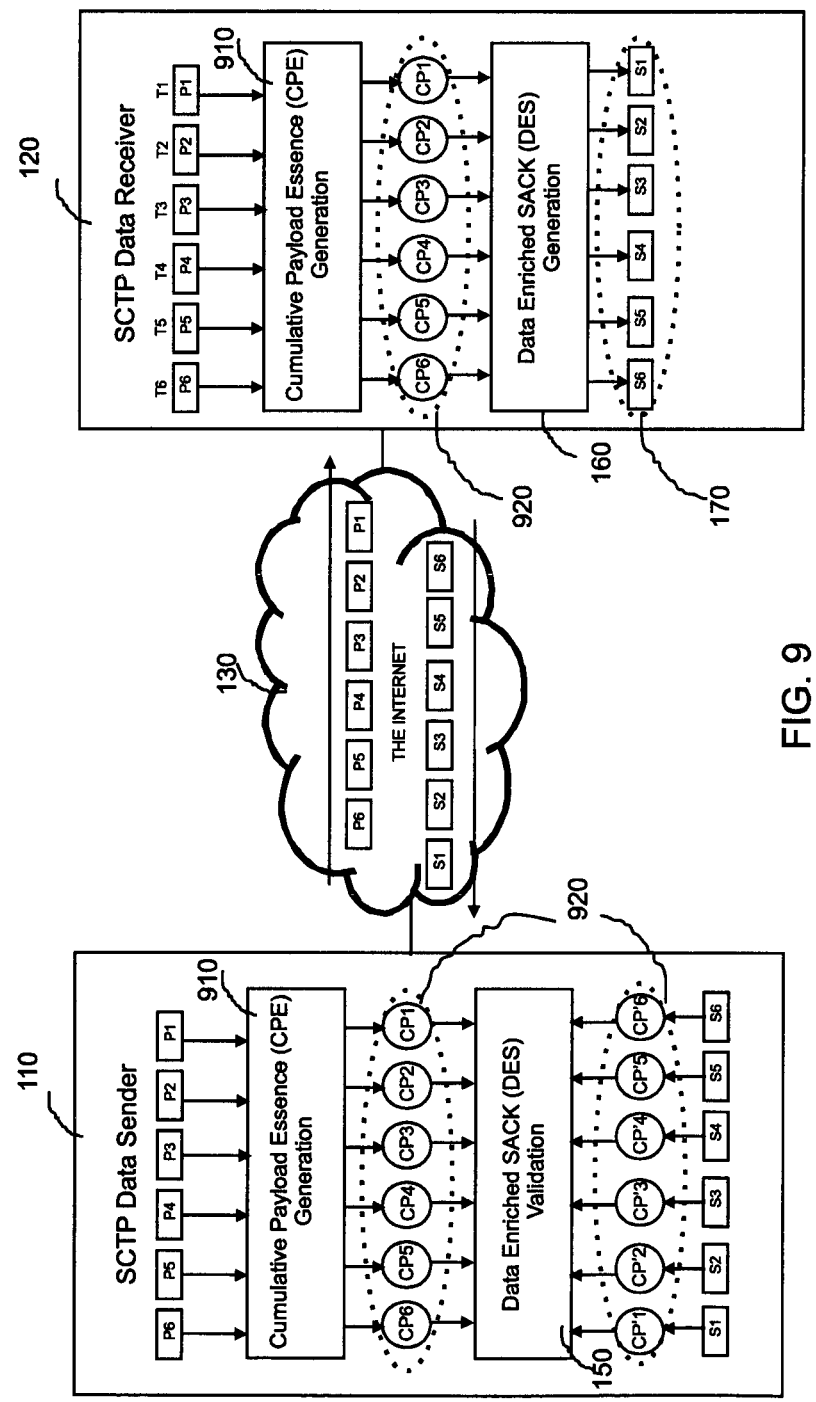
FIG. 9 represents data enriched SACK generation under non-reordered and non-duplicate data delivery scenario.
Figure 10:
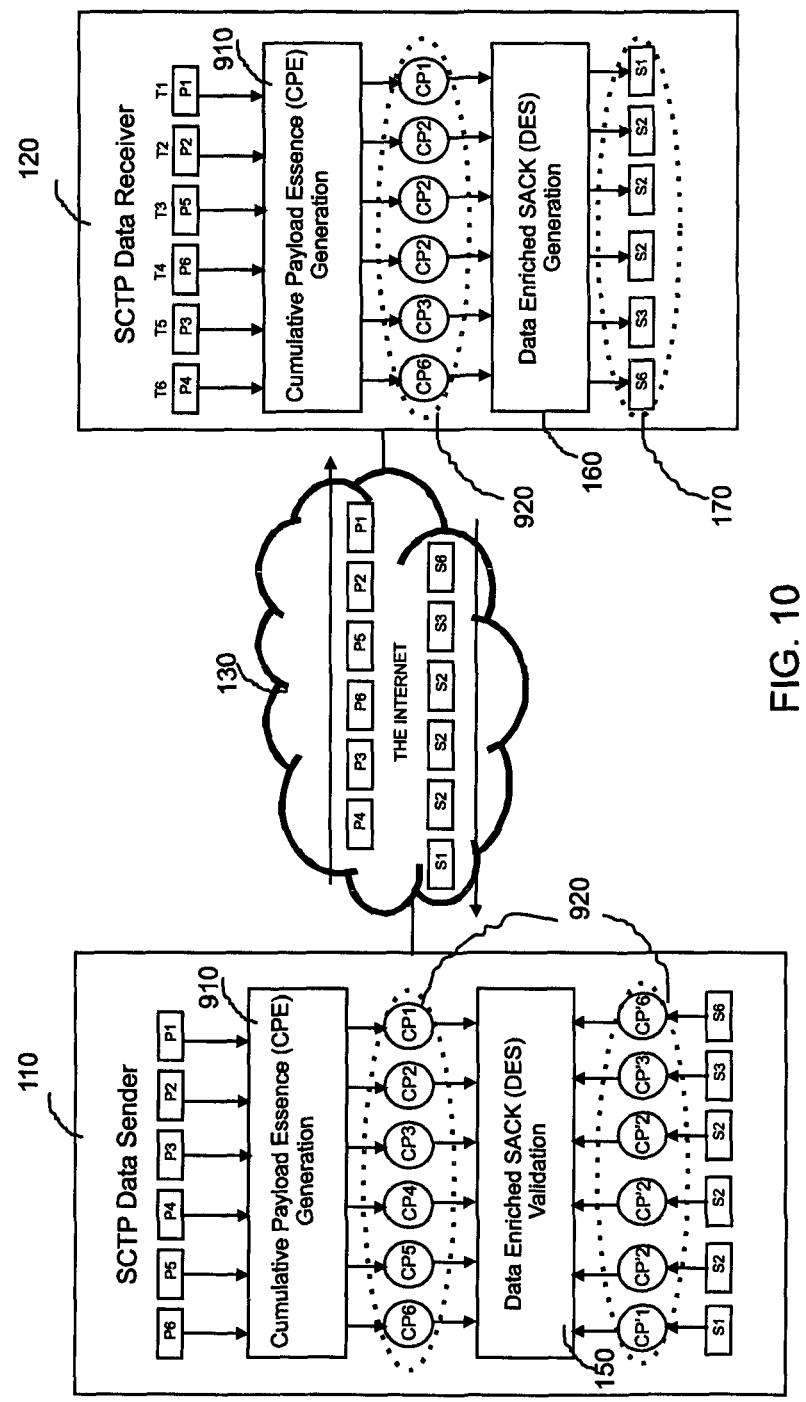
FIG. 10 represents data enriched SACK generation during data packet reordered scenario.
Figure 11:
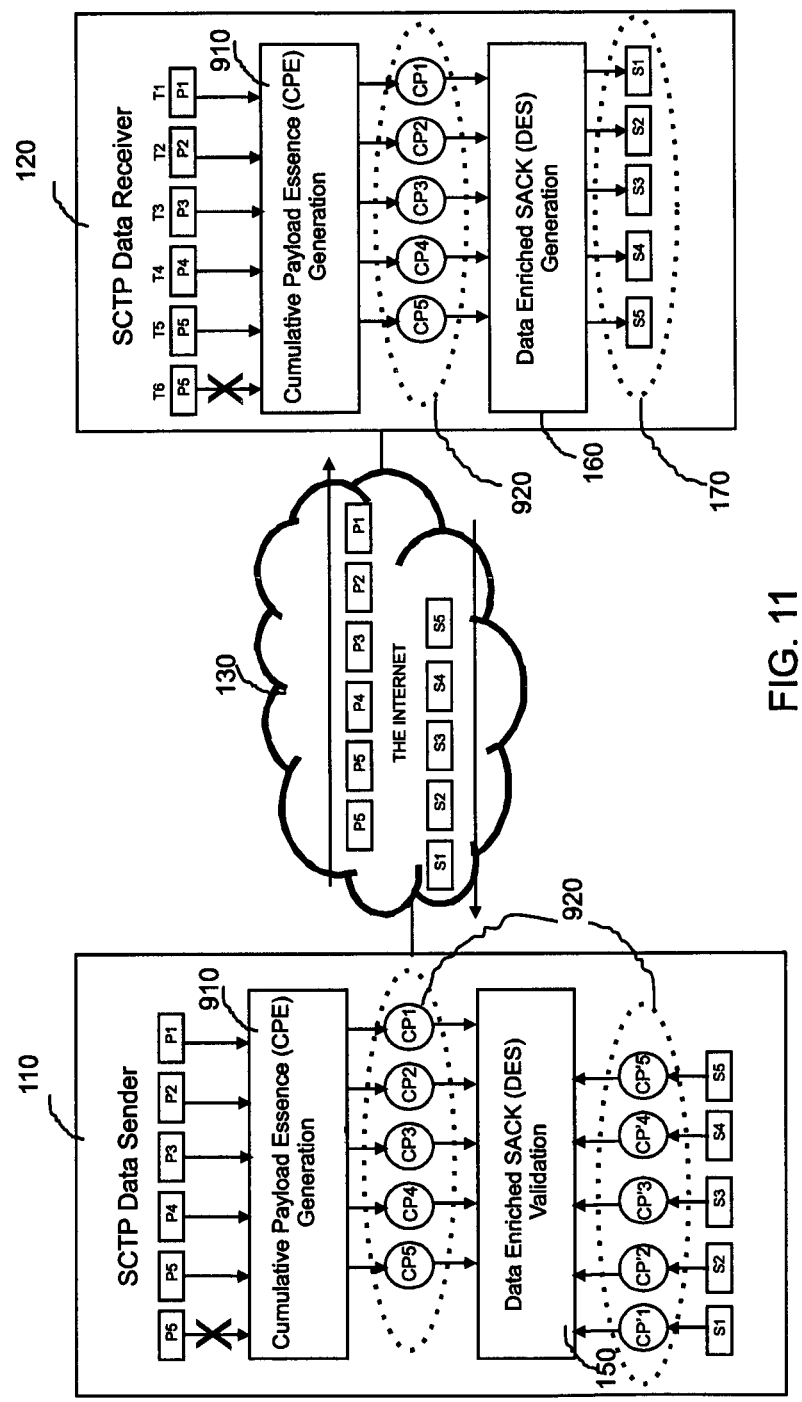
FIG. 11 represents Data Enriched SACK generation under duplicate data delivery scenario.

The details involved in Cumulative Payload Essence generation and the manner in which it is used for data enriched SACK generation are illustrated in FIG. 9, FIG. 10 and FIG. 11. First, FIG. 9 depicts a clear and relatively simple scenario in which data packets are neither lost nor reordered in the network. In this case, the SCTP data sender 110 sends data packets, P1, P2, P3, P4, P5, P6 etc. and retains a copy of them in its memory for future retransmission in the event of data packet loss. The data packets retained in the memory will be used later for generating Cumulative Payload Essence required for data enriched SACK validation when data enriched SACK acknowledging the data packets reaches the SCTP data sender 110. The data enriched SACK validation 150 is illustrated in detail at a later part of this art. The data packets P1, P2, P3, P4, P5, P6, etc. reach the SCTP data receiver 120 in the same order without any duplication at time T1, T2, T3, T4, T5, T6 respectively where T1<T2<T3<T4<T5<T6. The Cumulative Payload Essence generation module 910 at the SCTP data receiver 120 sets the initial value of Cumulative Payload Essence to the Initiate TAG received from the SCTP data sender 110 during the association establishment process. When data packet P1 reaches at time T1, the Cumulative Payload Essence generation module 910 at the SCTP data receiver 120 generates a fixed size payload essence (a binary sequence) from P1 and adds (binary addition) it to the initial Cumulative Payload Essence. The resulting Cumulative Payload Essence at the SCTP data receiver 120 is marked as CP1. The data enriched SACK, S1, generated to acknowledge data packet, P1, uses CP1 as the Cumulative Payload Essence. When P2 reaches the SCTP data receiver 120 at T2, the Cumulative Payload Essence generation module 910 at the SCTP data receiver 120 again generates a fixed size payload essence from P2 and adds it to the Cumulative Payload Essence CP1. The resulting new Cumulative Payload Essence is marked as CP2 and it is used for generating data enriched SACK, S2, for acknowledging data packet P2.

The process is continued for data packets P3, P4 and so on and the corresponding Cumulative Payload Essences at the SCTP data receiver 120 are marked as CP3, CP4 and so on. At any given time, only the latest Cumulative Payload Essence is retained. The number of bits in the fixed size payload essence extracted from individual data packets and the cumulative payload essence obtained by adding them is maintained the same. If the binary addition results in a cumulative payload essence, which is longer than the fixed size, the MSB (Most Significant Bit) of the Cumulative Payload Essence is neglected.

The present invention provides the manner in which the data packets reached out of order at the SCTP data receiver 120 are to be used for computation of Cumulative Payload Essence. SCTP data packets within an association are considered as reordered, if a data packet with lower TSN reaches the SCTP data receiver 120 after one or more data packets with a higher TSN reaches. Though an SCTP data sender always sends the data packets in order, i.e. packet 1 first, then packet 2 then packet 3 and so on, there are possibilities that these packets may get reordered in the intermediate network and hence reach the receiver out of order. Routing loop, link level parallelism and router or link failure are some of the possible reasons that can introduce packet reordering among packets belonging to same SCTP association. Data packet reordering and computation of Cumulative Payload Essence from reordered data packets are illustrated in FIG. 10.

In FIG. 10, the SCTP sender 110 sends data packets P1, P2, P3, P4, P5 and P6 in order (P1 first, P2 second and so on). The network 130 reorders them to a different sequence P1, P2, P5, P6, P3, P4. Here, packets P3 and P4 are reordered and the resulting packet sequence P1, P2, P5, P6, P3, P4 arrive at the SCTP data receiver 120 at time T1, T2, T3, T4, T5, T6 respectively where T1<T2<T3<T4<T5<T6. As illustrated in FIG. 10, the payloads of data packets P1 and P2 are used for computation of Cumulative Payload Essence immediately after their arrival at T1 and T2 at the SCTP data receiver 120, and the resulting Cumulative Payload Essences at the SCTP data receiver are marked as CP1 and CP2. When data packet P5 arrives at the SCTP data receiver 120 at T3, it is not immediately used for payload essence computation, and the Cumulative Payload Essence at T3 remains as CP2. This is because arrival of P5 has created a gap in the received TSN space of the SCTP data receiver, as P3 and P4 are not yet reached the receiver. The data enriched SACK generated by the SCTP data receiver 120 at T3 will use CP2 as the Cumulative Payload Essence. Similarly, when P6 arrives the SCTP data receiver 120 at time T4, its payload is not used immediately for computation of Cumulative Payload Essence, as P3 and P4 have still not arrived at the receiver. When P3 reaches at T5, its payload is used for the computation, as there is no gap in the received TSN space up to P3. However, the payload of P5 and P6 are still not immediately usable for computation as P4 is yet to reach and hence there is a gap in the TSN space. The resulting Cumulative Payload Essence at T5 is marked as CP3. Finally, once P4 reaches at time T6, the SCTP data receiver 120 uses the payloads of data packets P4, P5 and P6 for Cumulative Payload Essence computation, and the resulting Cumulative Payload Essence is CP6.

In summary, one embodiment of the invention defers the immediate use of payload of data packets that create a gap in the received TSN space of the SCTP data receiver, rather these packets are stored and used for calculation at a future point in time when the missing data packets arrive at the receiver and eventually fill the gap.

The present invention explicitly excludes the payload of duplicate TSN from being used for the calculation of Cumulative Payload Essence. For example, if a data packet containing a data chunk of TSN value N arrives at the SCTP data receiver 120 twice or more, all chunks with TSN value N except the first one is treated as duplicate and hence their payload is not used for computation of Cumulative Payload Essence. Those who know the prior art will appreciate that such arrival of duplicate data TSN at a SCTP data receiver can typically happen due to spurious retransmission, a scenario in which a data packet is retransmitted upon the expiry of the retransmission timeout (RTO) while the original transmission is still in the network, and subsequently both the original and retransmitted packet reach the receiver. Further, high degree of data packet reordering in the network can also result duplicate data packet arrival at the SCTP data receiver. This scenario is illustrated in FIG. 11 in which the SCTP data sender 110 retransmits (transmit twice) the data packet P5. Subsequently, P5 reaches the SCTP data receiver 120 twice at time T5 and T6. When P5 reaches for the first time at T5, its payload is used for computation of Cumulative Payload Essence CP5, and when P5 arrives again at T6, its payload is ignored. Hence the Cumulative Payload Essence at T6 remains as CP5.

In summary, according to one embodiment of the present invention, if more than one data packet with same TSN arrives at the SCTP data receiver, the payload of only the first data packet with the same TSN is used for Cumulative Payload Essence calculation and the remaining packets with the same TSN are ignored.

According to one embodiment of the present invention, the payload essence of individual data packet is computed using either the entire payload in the received data packet or any portion of the payload. Further, if partial payload is used for payload essence computation, the exact fraction of payload data to be used for the computation for a particular association is mutually agreed upon between the SCTP data sender and the SCTP data receiver during establishing the association by exchanging this information through the INIT and INIT ACK packets.

According to another embodiment of the invention, the payload essence is computed using the entire SCTP data packet including the common header and data chunk containing the data payload, instead of computing it using only the data payload.

According to yet another embodiment of the invention, the payload essence is computed using the Cyclic Redundancy Check (CRC) or Internet checksum or message digest. Alternately, the payload essence is any direct subset of the payload to reduce the extra computation involved in its calculation. Further, the SCTP data receiver can directly use the value of the readily available 32 bit Checksum in the common header of the received data packet as the payload essence to compute the Cumulative Payload Essence and there by eliminate the need of parsing the actual data payload and reduce the extra computation associated with payload essence calculation.

According to another embodiment of the present invention, the fixed size of both the payload essence and the Cumulative Payload Essence is the same and it is less than or equal to 32 bits to make it suitable to transport to the SCTP data sender through data enriched SACK or in a new control chunk explicitly defined for the purpose of transporting Cumulative Payload Essence.

Figure 12:
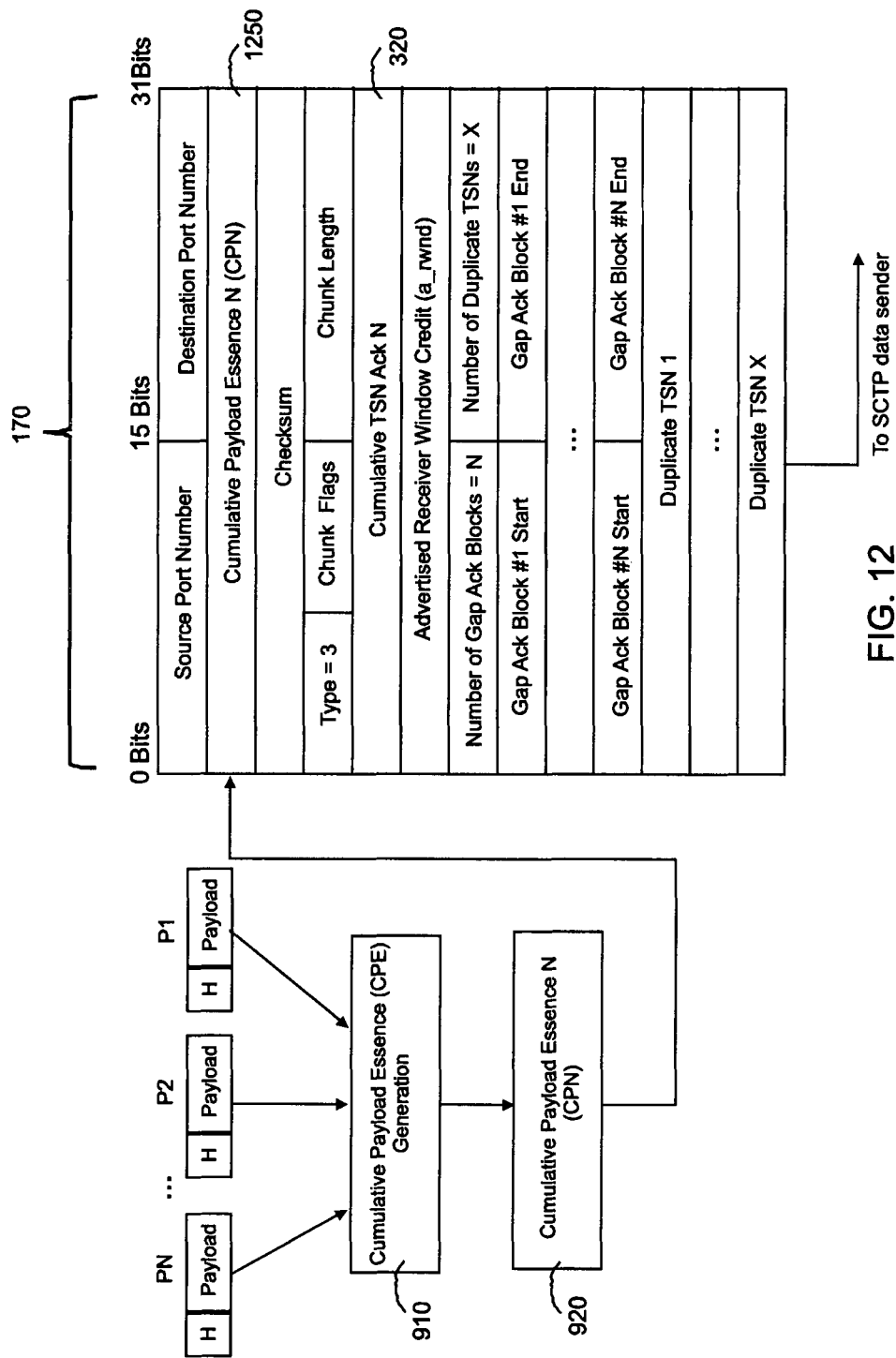
FIG. 12 represents an illustrative example of the format of data enriched SACK.

FIG. 12 provides one illustrative example showing the format of the data enriched SACK containing Cumulative Payload Essence obtained from the data packet payload. It represents one particular state of the SCTP data receiver in which the SCTP data receiver has received all data packets of TSN up to and including N. These data packets are marked as P1, P2, . . . PN. The SCTP data receiver now needs to generate a data enriched SACK to acknowledge the TSN N. The Cumulative Payload Essence generation 910 is performed using the payload essences of all these packets, and the resulting Cumulative Payload Essence 920 is marked as CPN. The data enriched SACK is generated by placing the Cumulative Payload Essence 920 in field 1250. The resulting data enriched SACK 170 is transmitted to the SCTP data sender. As the Verification Tag field of prior art SCTP SACK is now filled with the Cumulative Payload Essence, it is no more available in the data enriched SACK for the peer (here the SCTP data sender) for conventional Verification Tag checks performed in the prior art SCTP. However, the Cumulative Payload Essence fulfills the functional role of the Verification Tag, and the data enriched SACK validation presented in this invention eliminates the need of the conventional Verification Tag based packet validation described in RFC 4960.

Cumulative Payload Essence can also be transported back to the SCTP data sender in other ways. For example, it can be done by defining a new SCTP control chunk with chunk fields prescribed in section 3.2 "Chunk Field Descriptions" of IETF RFC 4960 in which the Cumulative TSN Ack and Cumulative Payload Essence are two chunk values. Alternately, payload essence may be transported back to the SCTP data sender by adding a new field to the SACK chunk and placing the Cumulative Payload Essence of all data packets received with TSN value less than or equal to the Cumulative TSN Ack of the SACK in the new field.

Reference is made to the SCTP data sender side in FIG. 8. When the data enriched SACKs containing the Cumulative Payload Essence reach the SCTP data sender 110, the 'Receive Data Enriched SACK' step 830 receives them. The received data enriched SACKs are next subjected to certain preliminary routine checks such as checksum verification in accordance with the IETF RFC 4960. If the data enriched SACKs fail these routine checks, they are discarded without any further processing (not shown in FIG. 8). According to one embodiment of the present invention, a data enriched SACK that passes the preliminary routine checks are further subjected to the data enriched SACK validation step 150. The validation step comprises of locally computing the Cumulative Payload Essence using the SCTP data packets kept in sender's retransmission buffer in step 810 'Retain Data for Future Retransmission' for possible retransmission in the event of non-reception of acknowledgement, and comparing the value of the locally computed Cumulative Payload Essence with the Cumulative Payload Essence extracted from the received data enriched SACK. If the comparison finds that the two values are different, the data enriched SACK validation 150 is failed and the incident is detected as optimistic SACK spoofing attack 850. The detected attack scenario could either be an attempt by a greedy SCTP receiver to download data from the SCTP data sender faster than normal SCTP receivers or an attempt by a malicious SCTP receiver to exploit the SCTP data sender as flood source for Denial-of-Service attacks. If the comparison finds that the two values are matching, the data enriched SACK validation 150 is successful and the received data enriched SACK is marked as authentic SACK.

According to one embodiment of the present invention, spoofed SACKs are not processed further. Rather they are discarded in step 860 'Discard Optimistic SACK' so that their contents such as Cumulative TSN Ack and Advertised Receiver Window Credit (a_rwnd) are not used by the SCTP sender for flow and congestion control. This in turn ensures that the SCTP data sender does not eject new data packets in response to incoming spoofed SACKs and hence prevents exploitation for flood generation. On the other hand, authentic data enriched SACKs are processed further, which in turn permits the SCTP data sender to continue with data transfer to genuine SCTP receiver. The Cumulative TSN Ack of authentic SACKs is used to remove the acknowledged data packets from the SCTP data sender's memory in step 870 'Remove Acknowledged Data'. The Authentic data enriched SACKs are further used for SCTP prior art 'Flow and Congestion Control' in step 880.

In another embodiment of the present invention, once a SACK spoofing based attack is detected, the SCTP data sender performs an early termination of the SCTP association in step 840 'Association Termination' to rescue the SCTP sender from the exploitation. The invention refers this as early termination, because the termination is performed in spite of the fact that the data sender still has more data to transmit, however, it decided not to serve the receiver any more through the current association. The SCTP data sender performs early termination of an association by sending a SCTP packet with ABORT control chunk, as per the standard format described in section 3.3.7 "Abort Association" of IETF RFC 4960. Through early termination, the SCTP sender releases resources such as memory and CPU time, which are being used for serving the malicious SCTP data receiver.

Attention is now shifted to the SCTP data sender side of FIG. 9 for a detailed description of the data enriched SACK validation with an illustrative example. When a data enriched SACK reaches the SCTP data sender 110, the data enriched SACK validation module 150 extracts both the Cumulative TSN Ack and Cumulative Payload Essence from it. Using the value of the Cumulative TSN Ack, the number of data packets newly acknowledged by the data enriched SACK and their TSNs are identified. The payload of data packets whose TSNs are newly acknowledged by the data enriched SACK are used by the Cumulative Payload Essence generation module 910 for the calculation of Cumulative Payload Essence. The initial value of the Cumulative Payload Essence is set to the Initiate Tag of the SCTP data sender 110, and the remaining procedure involved in the calculation of Cumulative Payload Essence is the same as that followed by the SCTP data receiver 120. Readers may note that when a particular data enriched SACK reaches the SCTP data sender 110, the data packets that are being newly acknowledged by this data enriched SACK are still available in the memory of the SCTP data sender for future retransmission and hence they can be readily used for computation of Cumulative Payload Essence. For a data enriched SACK to be authentic, the extracted value of the Cumulative Payload Essence from it should match with the Cumulative Payload Essence computed using all data packets of TSN up to and including the Cumulative TSN Ack of the data enriched SACK. In FIG. 9, S1, S2, S3, S4, etc. are data enriched SACKs received from the SCTP data receiver 120 and CP'1, CP'2, CP'3, CP'4, etc. are the respective Cumulative Payload Essence extracted from these data enriched SACKs. When the first data enriched SACK, S1, reaches the SCTP data sender 110, the corresponding computed value of Cumulative Payload Essence is CP1. Hence for S1 to be authentic the value of CP1 and CP'1 should match. CP1 is computed using the payload of data packet P1. Likewise, for the second data enriched SACK, S2, to be authentic, when it reaches the SCTP data sender, the corresponding computed value of Cumulative Payload Essence, CP2, should match with CP'2. For the computation of CP2, the payload of data packet P1 and P2 are used.

The following examples are given by way of illustration of the working of the invention in actual practice and should not be construed to limit the scope of the present invention in any way.

Example-1

The system in Example-1 consists of two autonomous communicating entities realized through two physically independent computers both with Linux operating system and TCP/IP communication protocol stack built into their respective operating system kernels. Both the computers have SCTP communication protocol at their respective transport layer of the TCP/IP stack. One computer is designated as the SCTP data sender and the second one as the SCTP data receiver. For the complete functioning of the system presented in this invention, it is essential that both the communicating entities with specified features must be part of the system. The SCTP data sender and the SCTP data receiver are connected to different Local Area Networks and configured to exchange IP packets between them through the Internet. The Local Area Network of SCTP data sender is connected to the Internet with a router and an access link of 8 Mbps bandwidth. The data sender and the data receiver are 14 hops apart on the Internet. Both the SCTP data sender and the SCTP data receiver run Linux Kernel.

Optimistic SACK spoofing is implemented on the operating system kernel of the SCTP data receiver and experiments are conducted to demonstrate the feasibility of DoS flood generation through optimistic SACK spoofing: The SACK spoofing strategy of the SCTP data receiver is the same as shown in FIG. 6 except that the SCTP data sender and the SCTP data receiver used 32 bit random numbers as their respective initial TSN. The SCTP data receiver initiates the establishment of SCTP association. After establishing the association, the SCTP data receiver requests for data transfer from the SCTP data sender and the SCTP data sender responds with four SCTP data packets. Upon the reception of the first SCTP data packet, the SCTP data receiver acknowledges the data packet by sending a SACK packet with Cumulative TSN Ack set to the TSN of the received SCTP data packet. The SCTP data receiver then generates a series of optimistic SACK packets by incrementing the Cumulative TSN Ack of successive optimistic SACK packets. As these optimistic SACK packets reach the SCTP data sender, they trigger new SCTP data packets, which collectively act as the DoS flood.

FIG. 7 gives representative results from a number of experimentations conducted over the Internet. In particular, the four plots in FIG. 7 show the time verses flood rates (number of bits per second) ejected by the SCTP data sender in response to spoofed optimistic SACK packets. The measurement is done at the SCTP data sender side. The first plot 710 shows a scenario in which the inter SACK time gap is adjusted to force the SCTP data sender to transmit at a rate of 5 Mbps, which is lesser than the bandwidth of the Internet access link of the SCTP data sender. However, the second plot 720, the third plot 730 and the fourth plot 740 show scenarios in which the sender is forced to eject flood of 10 Mbps, 15 Mbps and 20 Mbps respectively by controlling the time gaps among spoofed optimistic SACKs. These three rates are significantly higher than the bandwidth of the Internet access link (8 Mbps) of the SCTP data sender and have the required characteristics of DoS flood.

The invention detects and eliminates optimistic SACK spoofing based DoS attack on SCTP by implementing the data enriched SACK aware communication between the SCTP data sender and the SCTP data receiver. The sequence of interaction between the SCTP data sender and the SCTP data receiver involved in the data enriched SACK aware SCTP communication is shown in FIG. 8. The SCTP data sender contains the data enriched SACK validation functionalities disclosed in the invention and the SCTP data receiver contains the data enriched SACK generation functionalities disclosed in the invention. Both the functionalities are integrated at the kernel level and they interact with the underlying hardware like network interface card through the Internet Protocol (IP) layer and Network Interface Card device driver. A data enriched SACK aware SCTP communication is setup between the SCTP data sender and the SCTP data receiver. The associated SCTP packets (SCTP data packet and SCTP data enriched SACK packets) travel between the end-points (SCTP data sender and SCTP data receiver) through the building blocks of the Internet such as routers, links and switches. The SCTP data sender sends SCTP data packets to the SCTP data receiver. The SACK packets from the SCTP data receiver to the SCTP data sender are data enriched as shown in FIG. 12. For each data enriched SACK, the Cumulative Payload Essence is obtained from all the SCTP data packets that are cumulatively acknowledged by the Cumulative TSN Ack of the data enriched SACK. In this example, the cumulative value of the 32 bit checksum in the common header of individual SCTP data packet is calculated at the SCTP data receiver and used as the Cumulative Payload Essence for the data enriched SACK generation. The cumulative checksum of data is communicated back to the SCTP data sender by placing it in the 32 bit Verification Tag field of the data enriched SACK of the SCTP data receiver. Reordered SCTP data packets arriving at the SCTP data receiver are handled as shown in FIG. 10. Similarly, arrival of duplicate SCTP data packets at the SCTP data receiver is handled as shown in FIG. 11.

Upon reception of the data enriched SACK with cumulative checksum as the Cumulative Payload Essence, the SCTP data sender performs the data enriched SACK validation to detect and eliminate maliciously spoofed optimistic SACKs for Denial-of-Service flood generation. Deployment of the system in the invention enables the SCTP data sender to detect and eliminate optimistic SACK spoofing based attacks originating from malicious SCTP receivers located anywhere on the Internet.

Example-2

This example is similar to that in Example-1 except that here the system consisting of SCTP data sender and SCTP data receiver with the respective data enriched SACK validation and data enriched SACK generation capabilities are connected to the same Local Area Network and hence does not depend on the Internet for communication. Deployment of the system in the invention in an environment of this nature enables the SCTP data sender to detect and eliminate optimistic SACK spoofing based attacks originating from malicious SCTP receivers located within the same Local Area Network.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the disclosure, any limitations arising on account of the same are not intended. As would be apparent to a person in the art, various working modifications may be made to the method in order to implement the inventive concept as taught herein.

We claim:

1. A method for categorizing a Stream Control Transmission Protocol (SCTP) receiver terminal as a malicious SCTP receiver terminal generating spoofed optimistic SCTP selective acknowledgement (SACK) packet, comprising:
   (a) receiving, by a transceiver of a SCTP receiver terminal, a SCTP data packet containing a data chunk within a SCTP association;
   (b) generating, by a processor of the SCTP receiver terminal, a data enriched SCTP SACK packet, the data enriched SCTP SACK packet comprising a cumulative payload essence of all data chunks successfully received within the SCTP association; and
   (c) transmitting, by the transceiver of the SCTP receiver terminal, the data enriched SCTP SACK packet for enabling categorization of the SCTP receiver terminal as a malicious SCTP receiver terminal.

2. The method as claimed in claim 1, further comprising computing, by the processor of the SCTP receiver terminal, the cumulative payload essence of all data chunks successfully received.

3. The method as claimed in claim 2, wherein computing the cumulative payload essence of all data chunks successfully received comprises:
   (a) computing payload essences of all individual non-duplicate data chunks being acknowledged through the Cumulative TSN Ack (Cumulative Transmission Sequence Number Acknowledgement) field of the data enriched SACK packet;
   and (b) computing a cumulative payload essence as a binary sum of the payload essences of all individual non-duplicate data chunks being acknowledged through the Cumulative TSN Ack field of the data enriched SACK packet.

4. The method as claimed in claim 3, wherein the payload essence and the cumulative payload essence are in the form of binary sequence of size truncated to less than or equal to 32 bits.

5. The method as claimed in claim 3, wherein computing the payload essence of an individual data chunk includes parsing the data payload of the data chunk.

6. The method as claimed in claim 3, wherein computing the payload essence includes obtaining the 32 bit Checksum contained in the common header of the received SCTP data packet.

7. The method as claimed in claim 3, wherein computing the payload essence of an individual data chunk includes computing the payload essence using any one of (a) Cyclic Redundancy Check (CRC); (b) Internet Checksum; or (c) message digest.

8. The method as claimed in claim 3, wherein the payload essence is computed using at least one:
   (a) entire SCTP data packet consisting of common header and data chunk containing the payload;
   (b) the entire payload in the received data chunk; or
   (c) a portion of the payload in the received data chunk.

9. The method as claimed in claim 8, wherein if the payload essence is computed using a portion of the payload in the received data chunk, particulars of the portion of the payload to be used for the computation is predetermined for a particular SCTP association.

10. The method as claimed in claim 2, wherein the SCTP data packets having contiguous Transmission Sequence Number (TSN) are immediately considered for computing the payload essence.

11. The method as claimed in claim 10, further comprising the step of storing a SCTP data packet for use at a future point in time for computation of the cumulative payload essence, if the TSN of the SCTP data packet is greater than the TSN of the highest contiguous SCTP data packet received within the association.

12. The method as claimed in claim 1, wherein the data enriched SCTP SACK packet generation is performed by placing the cumulative payload essence in the Verification Tag field of the SCTP SACK packet.

13. A method for categorizing a Stream Control Transmission Protocol (SCTP) receiver terminal as a malicious SCTP receiver terminal generating spoofed optimistic SCTP selective acknowledgement (SACK) packet, comprising:
   (a) transmitting, by a transceiver of a SCTP transmitter terminal, SCTP data packets containing data chunks within a SCTP association;
   (b) receiving, by the transceiver of the SCTP transmitter terminal, a data enriched SCTP SACK packet from the SCTP receiver terminal, the data enriched SCTP SACK packet comprising a cumulative payload essence of all data chunks successfully received within the SCTP association;
   (c) computing, by a processor of the SCTP transmitter terminal, a cumulative payload essence of all data chunks successfully transmitted within the SCTP association;
   (d) comparing, by the processor of the SCTP transmitter terminal, the computed cumulative payload essence with the cumulative payload essence contained in the received data enriched SCTP SACK packet;
   (e) detecting, by the processor of the SCTP transmitter terminal, the presence of spoofed optimistic SCTP SACK packet if the value of the computed cumulative payload essence is different from the value of the cumulative payload essence contained in the received data enriched SCTP SACK packet; and
   (f) categorizing, by the processor of the SCTP transmitter terminal, the SCTP receiver terminal as a malicious SCTP receiver terminal based on the presence of spoofed optimistic SCTP SACK packet.

14. The method as claimed in claim 13, further comprising discarding spoofed optimistic SCTP SACK packet to avoid further transmission of SCTP data packets in response to spoofed optimistic SACK packet.

15. The method as claimed in claim 13, further comprising detecting optimistic SACK spoofing based Denial-of-Service attack or optimistic SACK spoofing based Distributed Denial-of-Service attack upon detecting the presence of spoofed optimistic SCTP SACK packet.

16. The method as claimed in claim 13, further comprising terminating the SCTP association with the SCTP receiver terminal in response to detecting optimistic SACK spoofing based Denial-of-Service attack or optimistic SACK spoofing based Distributed Denial-of-Service attack.

17. The method as claimed in claim 13, wherein computing the cumulative payload essence of all data chunks successfully transmitted comprises:
   (a) computing payload essences of all individual data chunks successfully transmitted and acknowledged through the Cumulative TSN Ack (Cumulative Transmission Sequence Number Acknowledgement) field of the received data enriched SACK packet; and (b) computing a cumulative payload essence as a binary sum of the payload essences of all individual non-duplicate data chunks successfully transmitted and acknowledged through the Cumulative TSN Ack field of the received data enriched SACK packet.

18. The method as claimed in claim 17, wherein the payload essence is computed using at least one of:

(a) entire SCTP data packet consisting of common header and data chunk containing the payload;

(b) the entire payload in the transmitted data chunk; or (c) a portion of the payload in the transmitted data chunk.

19. The method as claimed in claim 18, wherein if the payload essence is computed using a portion of the payload in the transmitted data chunk, particulars of the portion of the payload to be used for the computation is predetermined for a particular association.

20. The method as claimed in claim 17, wherein the payload essence and the cumulative payload essence are in the form of binary sequence of size truncated to less than or equal to 32 bits.

21. A receiver terminal implemented in a radio communication system and having a Stream Control Transmission Protocol (SCTP) based communication function, comprising:

a radio-receiver for receiving a SCTP data packet containing a data chunk within a SCTP association;

a computing device operationally connected to the radio receiver and configured for generating a data enriched SCTP selective acknowledgement (SACK) packet, the data enriched SCTP SACK packet comprising a cumulative payload essence of all data chunks successfully received within the SCTP association; and a radio-transmitter for transmitting the data enriched SCTP SACK packet generated by the computing device for enabling categorization of the SCTP receiver terminal as a malicious SCTP receiver terminal.

22. A transmitter terminal implemented in a radio communication system and having a Stream Control Transmission Protocol (SCTP) based communication function, comprising:

a radio-transmitter for transmitting SCTP data packets containing data chunks within a SCTP association;

a radio-receiver for receiving a data enriched SCTP selective acknowledgement (SACK) packet from a SCTP receiver terminal, the data enriched SCTP SACK packet comprising a cumulative payload essence of all data chunks successfully received within the SCTP association; and a computing-device operationally connected to the radio-receiver and the radio-transmitter and configured to:

compute a cumulative payload essence of all data chunks successfully transmitted within the SCTP association;

compare the computed cumulative payload essence with the cumulative payload essence contained in the received data enriched SCTP SACK packet;

detect the presence of spoofed optimistic SCTP SACK packet if the value of the computed cumulative payload essence is different from the value of the cumulative payload essence contained in the received data enriched SCTP SACK packet; and categorize the SCTP receiver terminal as a malicious SCTP receiver terminal based on the presence of spoofed optimistic SCTP SACK packet.

* * * * *